(12) United States Patent
Toyoda et al.

(10) Patent No.: US 10,942,872 B2
(45) Date of Patent: Mar. 9, 2021

(54) PERIPHERAL DEVICE, COMMUNICATION SYSTEM, CENTRAL CONTROL DEVICE, COMMUNICATION METHOD, AND RECORDING MEDIUM RECORDING COMMUNICATION PROGRAM

(71) Applicant: Olympus Corporation, Hachioji (JP)

(72) Inventors: Tetsuya Toyoda, Hachioji (JP); Koichi Shintani, Hachioji (JP); Kensei Ito, Sagamihara (JP); Katsuhisa Kawaguchi, Hachioji (JP); Yoshihisa Ogata, Hachioji (JP); Keito Fukushima, Mitaka (JP); Kazuhiko Osa, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/388,562

(22) Filed: Apr. 18, 2019

(65) Prior Publication Data

US 2019/0324925 A1 Oct. 24, 2019

(30) Foreign Application Priority Data

Apr. 20, 2018 (JP) .............................. JP2018-081576

(51) Int. Cl.
*G06F 13/10* (2006.01)
*G06F 13/00* (2006.01)

(52) U.S. Cl.
CPC .... *G06F 13/102* (2013.01); *G06F 2213/0042* (2013.01)

(58) Field of Classification Search
CPC ..... G06F 13/00; G06F 2213/00; G06F 13/102

USPC ........................................................... 710/33
See application file for complete search history.

(56) References Cited

U.S. PATENT DOCUMENTS

| 8,485,899 | B1* | 7/2013 | Rom ...................... A63F 13/798 463/31 |
| 9,707,477 | B2* | 7/2017 | Mahlmeister ......... A63F 13/285 |
| 2008/0318687 | A1* | 12/2008 | Backer .................... A63F 13/12 463/42 |
| 2009/0047645 | A1* | 2/2009 | Dibenedetto ............ A61B 5/11 434/258 |
| 2011/0065509 | A1* | 3/2011 | Rom .................. G06F 3/04842 463/37 |
| 2013/0065692 | A1* | 3/2013 | Aronzon ............... A63F 13/216 463/42 |
| 2015/0297990 | A1* | 10/2015 | Mahlmeister ........... A63F 13/24 463/37 |

(Continued)

FOREIGN PATENT DOCUMENTS

JP 2005-136693 5/2005

*Primary Examiner* — Christopher B Shin
(74) *Attorney, Agent, or Firm* — John C. Pokotylo; Pokotylo Patent Services

(57) ABSTRACT

A peripheral device communicates with a central control device. The peripheral device includes a control circuit. The control circuit is configured to acquire, from another peripheral device, first information including a topic provided for the central control device or a user of the central control device, integrate the first information with second information which is included in the peripheral device and includes a topic provided for the central control device or the user of the central control device, to generate third information, and transmit the third information.

13 Claims, 17 Drawing Sheets

(56) References Cited

U.S. PATENT DOCUMENTS

| | | | |
|---|---|---|---|
| 2016/0142763 A1* | 5/2016 | Kim | H04N 21/43615 |
| | | | 725/80 |
| 2019/0083882 A1* | 3/2019 | Soelberg | A63F 13/285 |
| 2019/0122125 A1* | 4/2019 | Dragicevic | G16H 20/00 |
| 2019/0132396 A1* | 5/2019 | Finnegan | H04L 67/125 |
| 2019/0141444 A1* | 5/2019 | Lee | H04R 3/005 |
| 2019/0253491 A1* | 8/2019 | Nonaka | G06F 13/387 |
| 2019/0302879 A1* | 10/2019 | Schwarz | G06F 3/016 |

* cited by examiner

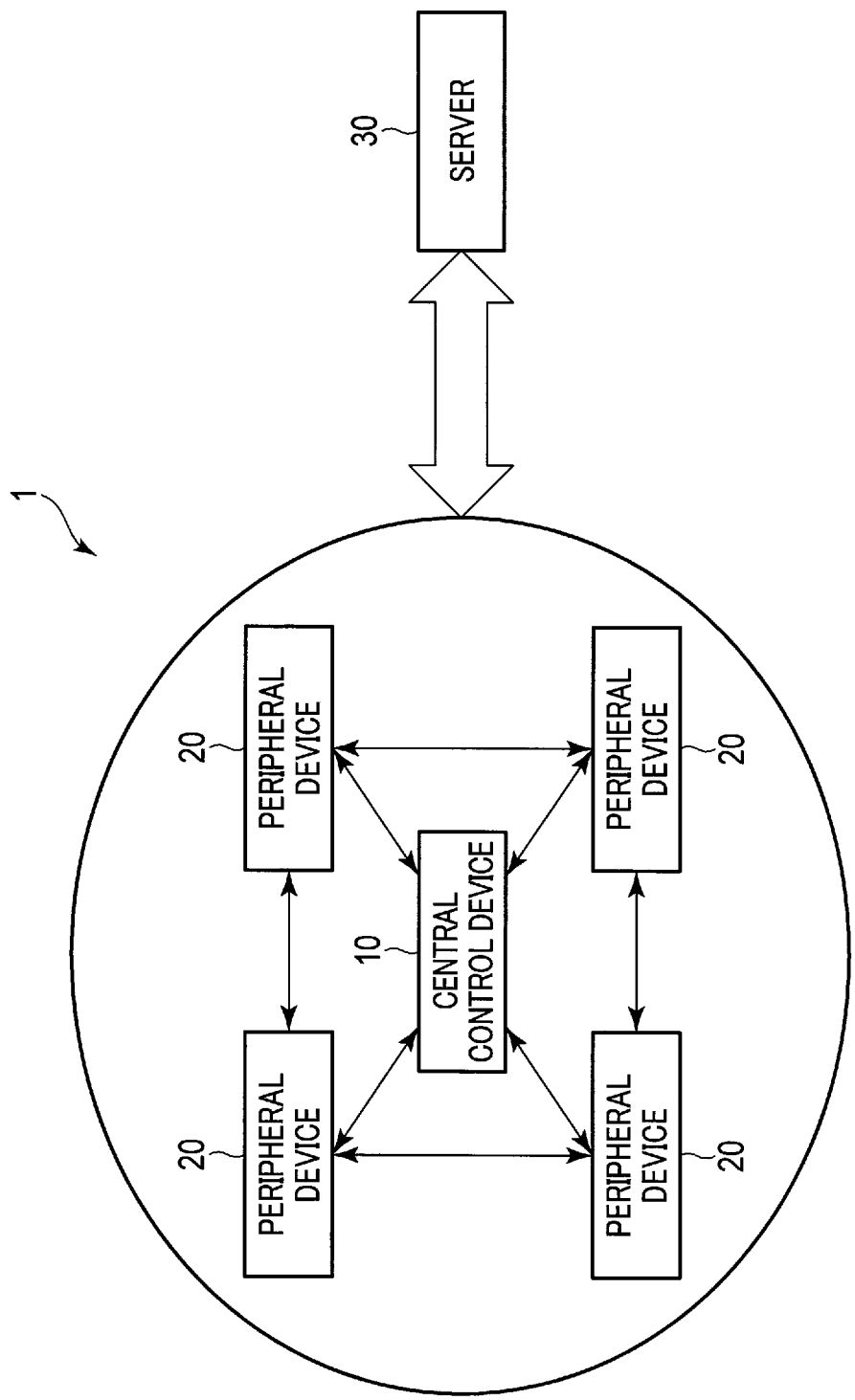
F I G. 1

| TYPE OF PERIPHERAL DEVICE | | USER→CENTRAL CONTROL DEVICE→ PERIPHERAL DEVICE (FIRST INFORMATION TRANSMISSION) | PERIPHERAL DEVICE→ PERIPHERAL DEVICE→ CENTRAL CONTROL DEVICE (SECOND INFORMATION TRANSMISSION) |
|---|---|---|---|
| INFORMATION DEVICE GROUP | PC | ・POWER ON/OFF<br>・APPLICATION START/END | ・REPORT OF USER SCHEDULE<br>・REPORT OF APPLICATION WHICH USER HAS NOT USED<br>・PROPOSAL FOR CONTENTS REPRODUCTION<br>・PROPOSAL FOR CONTENTS SHARING |
| | SMARTPHONE | ・POWER ON/OFF<br>・APPLICATION START/END | ・REPORT OF USER SCHEDULE<br>・REPORT OF APPLICATION WHICH USER HAS NOT USED<br>・PROPOSAL FOR CONTENTS REPRODUCTION<br>・PROPOSAL FOR CONTENTS SHARING |
| | DIGITAL CAMERA | ・POWER ON/OFF<br>・IMAGE CAPTURING START/END<br>・IMAGE REPRODUCTION START/END<br>・VARIOUS SETTINGS | ・PROPOSAL FOR CHARGING<br>・PROPOSAL FOR MEMORY EXCHANGE<br>・INFORMATION OF IMAGES CAPTURED TODAY<br>・INFORMATION OF IMAGES CAPTURED SO FAR<br>・PROPOSAL FOR IMAGE REPRODUCTION<br>・PROPOSAL FOR IMAGE SHARING<br>・PROPOSAL FOR IMAGE EDITING |
| | VOICE RECORDER | ・POWER ON/OFF<br>・RECORDING START/END<br>・VOICE REPRODUCTION START/END<br>・VARIOUS SETTINGS | ・PROPOSAL FOR CHARGING<br>・PROPOSAL FOR MEMORY EXCHANGE<br>・INFORMATION OF VOICE RECORDED TODAY<br>・INFORMATION OF VOICE RECORDED SO FAR<br>・PROPOSAL FOR VOICE REPRODUCTION<br>・PROPOSAL FOR VOICE SHARING<br>・PROPOSAL FOR VOICE EDITING |
| AV DEVICE GROUP | TV | ・POWER ON/OFF<br>・CHANGE OF CHANNELS<br>・DISPLAY OF PROGRAMS<br>・VARIOUS SETTINGS | PROPOSAL FOR RECOMMENDED PROGRAM |
| | AUDIO DEVICES | ・POWER ON/OFF<br>・MUSIC REPRODUCTION START/END<br>・VARIOUS SETTINGS | ・PROPOSAL FOR RECOMMENDED MUSIC<br>・PROPOSAL FOR REPRODUCTION OF CONTENTS TO WHICH USER HAS NOT LISTENED<br>・PROPOSAL FOR REPRODUCTION |
| | RECORDING DEVICES | ・POWER ON/OFF<br>・VIDEO REPRODUCTION START/END<br>・VARIOUS SETTINGS | ・PROPOSAL FOR RECOMMENDED PROGRAM<br>・PROPOSAL FOR REPRODUCTION OF CONTENTS WHICH USER HAS NOT WATCHED<br>・PROPOSAL FOR REPRODUCTION |

FIG. 6A

| TYPE OF PERIPHERAL DEVICE | | USER→CENTRAL CONTROL DEVICE→PERIPHERAL DEVICE (FIRST INFORMATION TRANSMISSION) | PERIPHERAL DEVICE→ PERIPHERAL DEVICE→ CENTRAL CONTROL DEVICE (SECOND INFORMATION TRANSMISSION) |
|---|---|---|---|
| SMART APPLIANCE GROUP | REFRIGERATOR | ·CONFIRMATION OF STORED ITEMS<br>·RECIPE DISPLAY<br>·VARIOUS SETTINGS | ·INFORMATION OF STORED ITEMS<br>·PROPOSAL FOR TODAY'S MENU |
| | AIR CONDITIONER | ·POWER ON/OFF<br>·CHANGE IN TEMPERATURE<br>·VARIOUS SETTINGS | ·PROPOSAL FOR USE OF AIR CONDITIONING ACCOMPANYING CHANGE IN TEMPERATURE<br>·PROPOSAL FOR CHANGE IN TEMPERATURE |
| | VACUUM CLEANER | ·CLEANING START/END<br>·VARIOUS SETTINGS | PROPOSAL FOR START OF CLEANING |
| | TOILET | ·LID OPEN/CLOSE<br>·FLUSH<br>·VARIOUS SETTINGS | PROPOSAL FOR START OF CLEANING |
| | LIGHTING DEVICE | ·POWER ON/OFF<br>·VARIOUS SETTINGS | PROPOSAL FOR BRIGHTNESS ADJUSTMENT |
| HOME SECURITY DEVICE GROUP | INTERCOM | ·DISPLAY ON/OFF<br>·IMAGE REPRODUCTION START/END<br>·VARIOUS SETTINGS | PROPOSAL FOR REPRODUCTION OF RECORDED IMAGES |
| | SURVEILLANCE CAMERA | ·POWER ON/OFF<br>·VIDEO REPRODUCTION START/END<br>·VARIOUS SETTINGS | PROPOSAL FOR REPRODUCTION OF RECORDED IMAGES |
| | ELECTRONIC LOCK | ·LOCK/UNLOCK | PROPOSAL FOR MAINTENANCE |

FIG. 6B

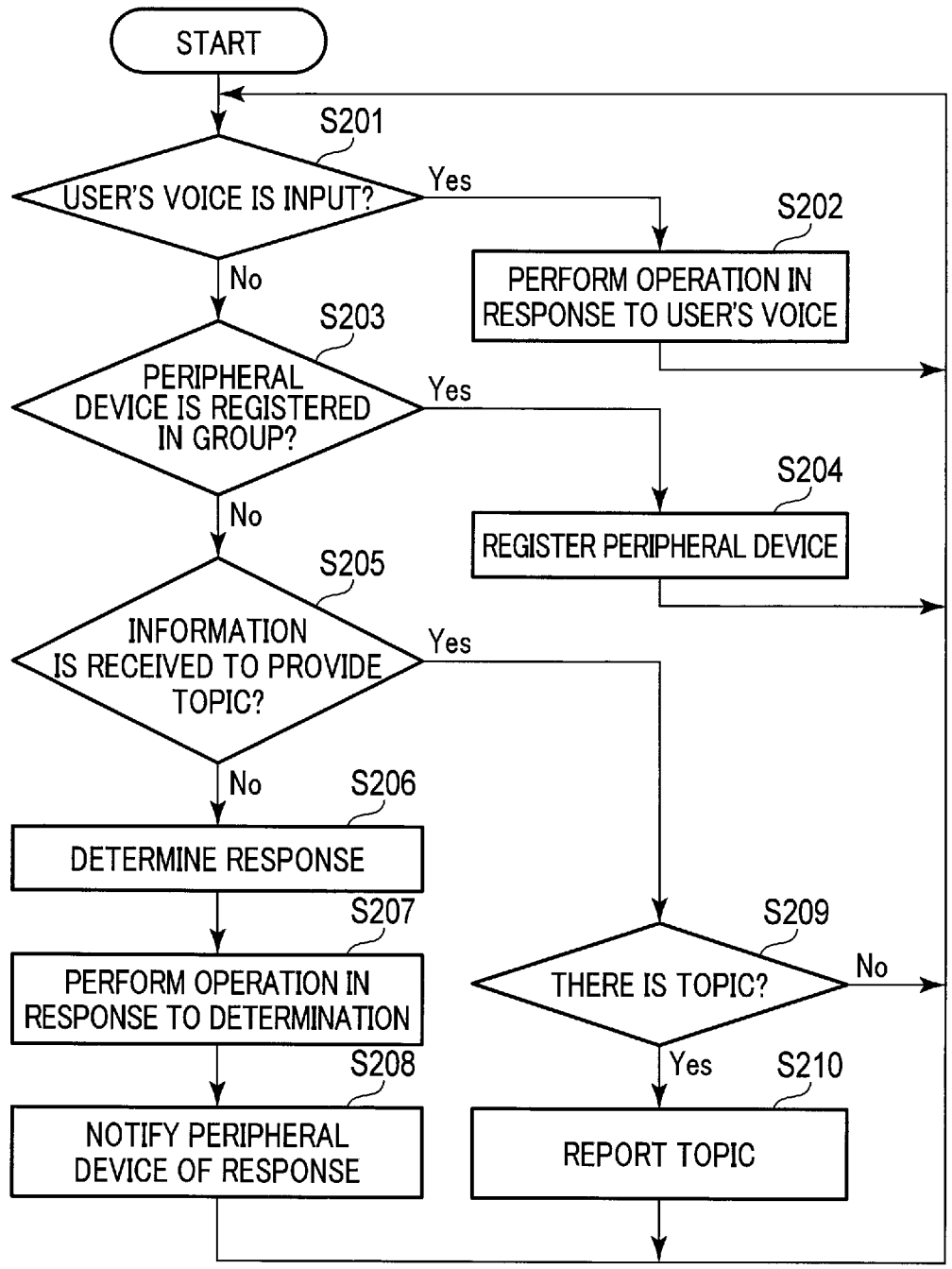
F I G. 10

| SIGNAL | | STATUS | AT THE TIME OF PURCHASE | BEFORE PHOTOGRAPHY |
|---|---|---|---|---|
| ADVERTISING SIGNAL | | UUID | PRESENCE | PRESENCE |
| | | REMAINING BATTERY LEVEL | CHARGING PROPOSAL PRESENCE /ABSENCE, ID | CHARGING PROPOSAL PRESENCE /ABSENCE, ID |
| | | MEMORY | MEMORY EXCHANGE PROPOSAL PRESENCE/ABSENCE, ID | MEMORY EXCHANGE PROPOSAL PRESENCE/ABSENCE, ID |
| | | IMAGE UTILIZATION | SAMPLE IMAGE PRESENCE/ABSENCE, ID | SAMPLE IMAGE PRESENCE/ABSENCE, ID |
| | | IMAGES CAPTURED TODAY | – | – |
| | | IMAGES CAPTURED SO FAR | – | – |
| | | PROPOSAL FOR USE OF CAMERA | PRESENCE/ABSENCE, ID | – |
| | | OTHERS | PRESENCE/ABSENCE, ID | PRESENCE/ABSENCE, ID |
| | | NEGOTIATION INFORMATION | ID | ID |
| DETAILS INFORMATION | | REMAINING BATTERY LEVEL | REMAINING BATTERY LEVEL | REMAINING BATTERY LEVEL |
| | | MEMORY | REMAINING MEMORY CAPACITY | REMAINING MEMORY CAPACITY |
| | | IMAGE UTILIZATION | SAMPLE IMAGE | SAMPLE IMAGE |
| | | IMAGES CAPTURED TODAY | – | – |
| | | IMAGES CAPTURED SO FAR | – | – |
| | | PROPOSAL FOR USE OF CAMERA | SAMPLE IMAGE, tips | – |
| | | OTHERS | PROPOSAL TO READ INSTRUCTIONS | PROPOSAL FOR USE OF ACCESSORIES, tips |

F I G. 11A

| SIGNAL | | STATUS | NIGHT AFTER PHOTOGRAPHY |
|---|---|---|---|
| ADVERTISING SIGNAL | UUID | | PRESENCE |
| | REMAINING BATTERY LEVEL | | CHARGING PROPOSAL PRESENCE/ABSENCE, ID |
| | MEMORY | | MEMORY EXCHANGE PROPOSAL PRESENCE/ABSENCE, ID |
| | IMAGE UTILIZATION | | IMAGE REPRODUCTION PROPOSAL PRESENCE/ABSENCE, ID<br>IMAGE SHARING PROPOSAL PRESENCE/ABSENCE, ID<br>IMAGE EDITING PROPOSAL PRESENCE/ABSENCE, ID |
| | IMAGES CAPTURED TODAY | | ID |
| | IMAGES CAPTURED SO FAR | | PRESENCE/ABSENCE, ID |
| | PROPOSAL FOR USE OF CAMERA | | — |
| | OTHERS | | PRESENCE/ABSENCE, ID |
| | NEGOTIATION INFORMATION | | ID |
| DETAILS INFORMATION | REMAINING BATTERY LEVEL | | REMAINING BATTERY LEVEL |
| | MEMORY | | REMAINING MEMORY CAPACITY |
| | IMAGE UTILIZATION | | IMAGE NAME TO PROPOSE REPRODUCTION/SHARING/EDITING |
| | IMAGES CAPTURED TODAY | | •CUMULATIVE NUMBER OF IMAGES CAPTURED TODAY, SUBJECT TO BE IMAGED FOR CAPTURING, CAPTURING CONDITIONS, AND PRESENCE OR ABSENCE OF ACCESSORY<br>•NUMBER OF SNAPSHOTS TAKEN TODAY, SUBJECT TO BE IMAGED FOR CAPTURING, CAPTURING CONDITIONS, AND PRESENCE OR ABSENCE OF ACCESSORY<br>•NUMBER OF GROUP PHOTOGRAPHS TAKEN TODAY, SUBJECT TO BE IMAGED FOR CAPTURING, CAPTURING CONDITIONS, AND PRESENCE OR ABSENCE OF ACCESSORY<br>•NUMBER OF LANDSCAPE PHOTOGRAPHS TAKEN TODAY, SUBJECT TO BE IMAGED FOR CAPTURING, CAPTURING CONDITIONS, AND PRESENCE OR ABSENCE OF ACCESSORY<br>•NUMBER OF MOVIE IMAGES CAPTURED TODAY, SUBJECT TO BE IMAGED FOR CAPTURING, CAPTURING CONDITIONS, AND PRESENCE OR ABSENCE OF ACCESSORY<br>•NUMBER OF IMAGES FAILED TODAY, DETAILS OF FAILURE |
| | IMAGES CAPTURED SO FAR | | •CUMULATIVE NUMBER OF IMAGES CAPTURED SO FAR, SUBJECT TO BE IMAGED FOR CAPTURING, CAPTURING CONDITIONS, AND PRESENCE OR ABSENCE OF ACCESSORY<br>•NUMBER OF SNAPSHOTS TAKEN FOR EACH DATE, SUBJECT TO BE IMAGED FOR CAPTURING, CAPTURING CONDITIONS, AND PRESENCE OR ABSENCE OF ACCESSORY<br>•NUMBER OF GROUP PHOTOGRAPHS TAKEN FOR EACH DATE, SUBJECT TO BE IMAGED FOR CAPTURING, CAPTURING CONDITIONS, AND PRESENCE OR ABSENCE OF ACCESSORY<br>•NUMBER OF LANDSCAPE PHOTOGRAPHS TAKEN FOR EACH DATE, SUBJECT TO BE IMAGED FOR CAPTURING, CAPTURING CONDITIONS, AND PRESENCE OR ABSENCE OF ACCESSORY<br>•NUMBER OF MOVIE IMAGES CAPTURED FOR EACH DATE, SUBJECT TO BE IMAGED FOR CAPTURING, CAPTURING CONDITIONS, AND PRESENCE OR ABSENCE OF ACCESSORY<br>•NUMBER OF IMAGES FAILED FOR EACH DATE, DETAILS OF FAILURE |
| | PROPOSAL FOR USE OF CAMERA | | — |
| | OTHERS | | tips |

FIG. 11B

| SIGNAL \ STATUS | | NIGHT AFTER PHOTOGRAPHY |
|---|---|---|
| ADVERTISING SIGNAL | UUID | PRESENCE |
| | REMAINING BATTERY LEVEL | CHARGING PROPOSAL PRESENCE/ABSENCE, ID |
| | MEMORY | MEMORY EXCHANGE PROPOSAL PRESENCE/ABSENCE, ID |
| | IMAGE UTILIZATION | IMAGE REPRODUCTION PROPOSAL PRESENCE/ABSENCE, ID<br>IMAGE SHARING PROPOSAL PRESENCE/ABSENCE, ID<br>IMAGE EDITING PROPOSAL PRESENCE/ABSENCE, ID |
| | IMAGES CAPTURED TODAY | — |
| | IMAGES CAPTURED SO FAR | PRESENCE/ABSENCE, ID |
| | PROPOSAL FOR USE OF CAMERA | PRESENCE/ABSENCE, ID |
| | OTHERS | PRESENCE/ABSENCE, ID |
| | NEGOTIATION INFORMATION | ID |
| DETAILS INFORMATION | REMAINING BATTERY LEVEL | REMAINING BATTERY LEVEL |
| | MEMORY | REMAINING MEMORY CAPACITY |
| | IMAGE UTILIZATION | IMAGE NAME TO PROPOSE REPRODUCTION/SHARING/EDITING |
| | IMAGES CAPTURED TODAY | — |
| | IMAGES CAPTURED SO FAR | •CUMULATIVE NUMBER OF IMAGES CAPTURED SO FAR, SUBJECT TO BE IMAGED FOR CAPTURING, CAPTURING CONDITIONS, AND PRESENCE OR ABSENCE OF ACCESSORY<br>•NUMBER OF SNAPSHOTS TAKEN FOR EACH DATE, SUBJECT TO BE IMAGED FOR CAPTURING, CAPTURING CONDITIONS, AND PRESENCE OR ABSENCE OF ACCESSORY<br>•NUMBER OF GROUP PHOTOGRAPHS TAKEN FOR EACH DATE, SUBJECT TO BE IMAGED FOR CAPTURING, CAPTURING CONDITIONS, AND PRESENCE OR ABSENCE OF ACCESSORY<br>•NUMBER OF LANDSCAPE PHOTOGRAPHS TAKEN FOR EACH DATE, SUBJECT TO BE IMAGED FOR CAPTURING, CAPTURING CONDITIONS, AND PRESENCE OR ABSENCE OF ACCESSORY<br>•NUMBER OF MOVIE IMAGES CAPTURED FOR EACH DATE, SUBJECT TO BE IMAGED FOR CAPTURING, CAPTURING CONDITIONS, AND PRESENCE OR ABSENCE OF ACCESSORY<br>•NUMBER OF IMAGES FAILED FOR EACH DATE, DETAILS OF FAILURE |
| | PROPOSAL FOR USE OF CAMERA | tips<br>•SAMPLE IMAGE<br>•CUMULATIVE NUMBER OF IMAGES CAPTURED SO FAR, SUBJECT TO BE IMAGED FOR CAPTURING, CAPTURING CONDITIONS, AND PRESENCE OR ABSENCE OF ACCESSORY<br>•NUMBER OF SNAPSHOTS TAKEN SO FAR, SUBJECT TO BE IMAGED FOR CAPTURING, CAPTURING CONDITIONS, AND PRESENCE OR ABSENCE OF ACCESSORY<br>•NUMBER OF GROUP PHOTOGRAPHS TAKEN SO FAR, SUBJECT TO BE IMAGED FOR CAPTURING, CAPTURING CONDITIONS, AND PRESENCE OR ABSENCE OF ACCESSORY<br>•NUMBER OF LANDSCAPE PHOTOGRAPHS TAKEN SO FAR, SUBJECT TO BE IMAGED FOR CAPTURING, CAPTURING CONDITIONS, AND PRESENCE OR ABSENCE OF ACCESSORY<br>•NUMBER OF MOVIE IMAGES CAPTURED SO FAR, SUBJECT TO BE IMAGED FOR CAPTURING, CAPTURING CONDITIONS, AND PRESENCE OR ABSENCE OF ACCESSORY<br>•NUMBER OF IMAGES FAILED SO FAR, DETAILS OF FAILURE |
| | OTHERS | |

FIG. 11C

PERIPHERAL DEVICE, COMMUNICATION SYSTEM, CENTRAL CONTROL DEVICE, COMMUNICATION METHOD, AND RECORDING MEDIUM RECORDING COMMUNICATION PROGRAM

CROSS-REFERENCE TO RELATED APPLICATION

This application is based upon and claims the benefit of priority from prior Japanese Patent Application No. 2018-081576, filed Apr. 20, 2018, the entire contents of which are incorporated herein by reference.

FIELD

Embodiments relate to a peripheral device, a communication system, a central control device, a communication method, and a recording medium recording a communication program.

BACKGROUND

Along with the recent progress of artificial intelligence (AI) technology, attempts have been made to mount AI in various devices. As a representative example of this type of AI-mounted device, for example, a smartphone is known. As a device specialized for placement in a home, a device called a smart speaker is known. The smart speaker has an interactive AI assistant. In response to voice instructions from a user, the AI assistant provides various services such as reproducing music, and searching for necessary information from the Internet or the like and reporting it to the user. When the learning of the AI assistant progresses, it is expected that the AI assistant will determine the information of interest to the user and report the determined information to the user, without receiving detailed instructions from the user. The technology associated with this type of collection of information is disclosed in, for example, Jpn. Pat. Appln. KOKAI Publication No. 2005-136693.

It is also expected that AI-mounted devices such as a smartphones and smart speakers will become a central control device to control various Internet of Things (IoT) devices such as capture devices, audio and visual devices and smart appliances as peripheral devices. In this case, when the AI assistant of the central control device makes various proposals for the user and controls the peripheral devices, it is assumed that the central control device collects various types of information about the peripheral devices.

SUMMARY

According to embodiments, there is provided a peripheral device which communicates with a central control device, the peripheral device comprising a control circuit configured to: acquire, from another peripheral device, first information including a topic provided for the central control device or a user of the central control device; integrate the first information with second information which is included in the peripheral device and includes a topic provided for the central control device or the user of the central control device, to generate third information; and transmit the third information.

Advantages of the embodiments will be set forth in the description which follows, and in part will be obvious from the description, or may be learned. The advantages may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments, and together with the general description given above and the detailed description of the embodiments given below, serve to explain the principles.

FIG. 1 is a diagram illustrating a configuration of an example of a communication system according to first and second embodiments.

FIG. 6A is a diagram for explaining information transmission between the central control device and the peripheral device in the first embodiment.

FIG. 6B is a diagram for explaining information transmission between the central control device and the peripheral device in the first embodiment.

FIG. 10 is a flowchart illustrating the operation of the central control device in the first embodiment.

FIG. 11A is a diagram illustrating an example of contents of an advertising signal and detailed information communicating as second information transmission.

FIG. 11B is a diagram illustrating an example of contents of an advertising signal and detailed information communicating as second information transmission.

FIG. 11C is a diagram illustrating an example of contents of an advertising signal and detailed information communicating as second information transmission.

DETAILED DESCRIPTION

Figure 2:
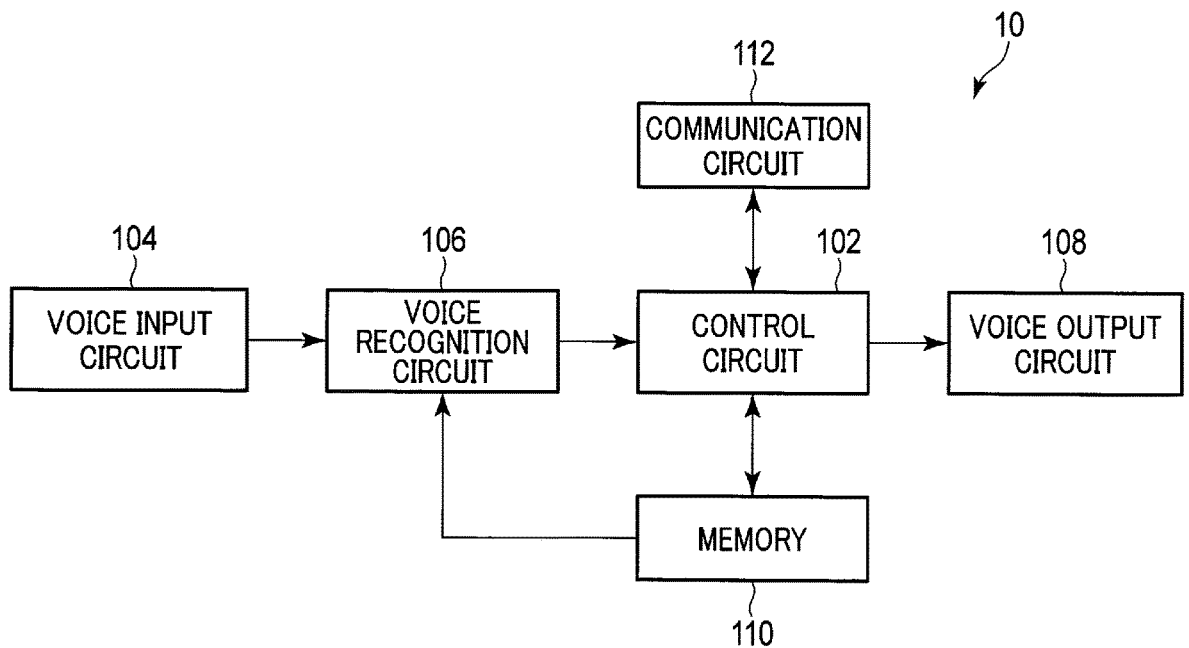
FIG. 2 is a block diagram illustrating a configuration of an example of a central control device.

If a variety of devices are connected to a network, a user has to recognize all the conditions of the devices, which will become load of communication and processing and place excessive burden on the user in terms of power management. For a central control device, too, it is a great problem how to process various items of information of each of the devices. Embodiments therefore aim to deal with the load of communication and processing and various problems of power management and the like by grouping specific peripheral devices.

Embodiments will be described below with reference to the drawings.

First Embodiment

A first embodiment will be described. FIG. 1 is a diagram illustrating a configuration of an example of a communication system according to first and second embodiments. The communication system 1 includes a central control device 10 and a plurality of peripheral devices 20. In FIG. 1, four peripheral devices 20 are illustrated. The central control device 10 and each of the peripheral devices 20 communicate with each other. In addition, the central control device 10 and each of the peripheral devices 20 communicate with a server 30. The peripheral devices 20 communicate with each other. The central control device 10 and the peripheral devices 20 exist within a relatively narrow range in a house or the like. On the other hand, the server 30 may be positioned near the central control device 10 and the peripheral devices 20, or may be positioned far therefrom.

The central control device 10 is, for example, a smart speaker having an interactive user interface using voice. The central control device 10 may be a stationary smartphone. In most cases, however, smartphones are designed, placing importance on personal use or portability. The central control device 10 will be described on the assumption that it is used by a group such as a family in a house, an office, a laboratory and the like. In such a case, the central control device 10 can be of course replaced with a personal computer and a tablet PC. The central control device 10 can be incorporated in home appliances such as lighting fixtures, air conditioners, televisions, refrigerators and vacuum cleaners. The central control device 10 issues a variety of items of information from a speaker as a voice according to the user's voice. The central control device 10 also performs remote control of the peripheral devices 20. The central control device 10 has artificial intelligence. The central control device 10 may include a non-interactive user interface.

Each of the peripheral devices 20 is a device that can communicate with the central control device 10 and the server 30. The peripheral devices 20 can also communicate with each other. The peripheral devices 20 are, for example, an information device group. The information device group is a device for acquiring and managing a variety of items of information. The information device group includes, for example, devices such as digital cameras, voice recorders, personal computers (PCs), and smartphones. In addition, the peripheral devices 20 are, for example, an audio and visual (AV) device group. The audio and visual device group is a device for recording or reproducing video or voice. The audio and visual device group includes devices such as televisions, recording devices, and audio devices. In addition, the peripheral devices 20 are, for example, a smart appliance group. The smart appliance group is a home appliance having a communication function. The smart appliance group includes devices such as smart air conditioners, smart refrigerators, smart vacuum cleaners, smart toilets, and smart lighting devices. The peripheral devices 20 are also a home security device group. The home security device group is a device related to security in the home. The home security device group includes devices such as intercoms, surveillance cameras, and electronic locks. Here, although the peripheral devices constituting the home network are exemplified, the technology of the present embodiment can also be applied to peripheral devices constituting a network in cooperation with specific central control devices in business places, hospitals, laboratories and the like. In the hospitals, laboratories and the like, various dedicated devices (observation devices, inspection devices, etc.) are arranged. However, there are devices in which the central control devices may not necessarily constitute a network. Since the use of the peripheral devices 20 can be grouped into several categories as described above, the grouping can produce various items of summary information. The grouping does not necessarily correspond to a merchandise category. For example, room temperature is included in a group of the comfort of human beings and the physical condition management and related to air conditioners, electric fans, refrigerators, etc., not included in a group of an information acquisition system such as televisions and radios. If the televisions and radios of the information acquisition system are grouped into an entertainment system, they can constitute a group together with audio devices. The summary information items of the groups are integrated, and the integrated information can be transmitted to a user. Of course, when the living environment becomes satisfactory, the operation of entertainment devices may become important. In this case, the group of the entertainment devices may cooperate as a larger group. The central control device may control the condition of each device frequently; however, when the central control device is particularly used for other applications, it may be more convenient to receive information from each device in a push-type fashion because it can concentrate on its applications and its quick response can be secured.

When there are a plurality of peripheral devices 20 capable of communicating with the central control device 10, the peripheral devices 20 may be the same or different. The peripheral devices 20 can communicate with the central control device 10 and have only to communicate with each other, and may not be able to communicate with the server 30. The peripheral devices 20 may or may not have artificial intelligence.

The server 30 stores a variety of items of information. The central control device 10 searches the server 30 for necessary information. The server 30 may include a single computer or the like. The server 30 may include a plurality of computers or the like. A plurality of servers 30 may be distributed on the network.

The server 30 may work as artificial intelligence. As the artificial intelligence, circuits and programs for performing a function of causing an action such as generating a specific process for each condition among sequential processes according to a recorded program are assumed. All of these circuits and programs need not be inside the same device. The programs for realizing the artificial intelligence may be frequently updated. For example, when the user selects only a specific branch process in sequential processes and does not select the other branch processes, the update for further subdividing the branch process with many times of selection may be performed. Therefore, customization suitable for the user is made. For example, even if simple information such as instructing turning on the power of the specific peripheral device or instructing turning off the power of the specific peripheral device is given, conditional branching may be made depending on the frequency of these instructions. For example, it is considered that users who frequently issue instructions such as turning on or off the peripheral devices frequently use the peripheral devices. In this case, when an instruction to turn on or off the power of the peripheral device is issued, the artificial intelligence presents maintenance information rather than information on how to use the peripheral device. There may be the opposite cases depending on the peripheral devices or circumstances. Further advanced machine learning may be performed. For example, when learning the relationship between the voice instructing to turn on or off and the specific peripheral device, the artificial intelligence is expected to be able to determine to which one of the peripheral devices information should be given.

Specifying a user by using voice can be realized by, for example, learning a voiceprint pattern of a user. As a user behavior analysis method, there is also a technique for analyzing the behavior of the user from the usage history of information devices such as smartphones. For example, from the history of a date and time at which the information device was used and a place at which the information device was used, it can be determined which season and which day of the week the user of the information device is likely to go to, and the like. In addition, by deep learning using information such as purchase information of products or images captured with cameras, it is possible to predict user's behavior or to determine user's preference. For example, the artificial intelligence learns the relationship between time obtained by a clock embedded in an information device and a place obtained by a position detection circuit as teacher data. Therefore, the artificial intelligence can infer where the probability of going to a certain point in the future (e.g. the weekend of the next week) is high, and that the user would like to go there. When the artificial intelligence learns event information related to the place, the artificial intelligence can also infer what kind of event you want and when you want to go, or the like. Based on such inference, the artificial intelligence can determine that it will be pleased to search for information of such an event appropriately and present the information to the user beforehand. The artificial intelligence is also expected to analyze a subject from an image captured by a camera and to infer, from the relationship between the subject and the capturing time, when the person wants to take a photograph and what kind of photograph the person wants to take. Similarly, the artificial intelligence can also determine information about the date and time and the place where a specific subject appears, based on information about the capturing date and time and capturing place of a similar image including the specific subject on the Internet or information about date and time or place contained in a text related to the specific subject. Furthermore, the artificial intelligence is expected to infer the place and the date and time appropriate for capturing by learning using information on the Internet as teacher data. With such inference, the artificial intelligence provides information to users in advance in consideration of a period that the user can prepare (for example, one month for distant places, or one week for close places). The artificial intelligence provides information of close places for users who are determined not to like long distance travel. Therefore, it is possible to provide information more reflecting the user's preference. The same way of thinking can be applied to the time to provide information. For example, the artificial intelligence may determine information that should be provided only at the timing when the user is nearby and when it is not busy time in the morning and information that should be provided in the busy time zone, and may provide the information. It is preferable that control is performed such that specific information is output by learning using time zones, categories of valid information, and categories of invalid information by causing the user to answer whether the provided information is valid for the user. When a specific user's voice is input, the artificial intelligence may provide information suitable for the user's preference, or provide similar information based on the voice input from the user. The artificial intelligence may also prepare some information in advance and provide the information appropriately. Even if there is no input of the voice of the specific user, when it is determined that a situation is a specific situation based on the action pattern of the user and the information about the history of the peripheral device operated by the user, the artificial intelligence may provide Information on the assumption that a specific user is present there.

Hereinafter, the central control device 10 and the peripheral devices 20 will be further described. FIG. 2 is a block diagram illustrating a configuration of an example of the central control device 10. As illustrated in FIG. 2, the central control device 10 includes a control circuit 102, a voice input circuit 104, a voice recognition circuit 106, a voice output circuit 108, a memory 110, and a communication circuit 112.

The control circuit 102 controls the operation of each block of the central control device 10. The control circuit 102 includes hardware such as a CPU, a GPU, an ASIC, an FPGA, and a main memory. The control circuit 102 also operates as an AI assistant having artificial intelligence according to programs and libraries stored in the memory 110. This artificial intelligence program may not be stored in the memory 110. For example, the artificial intelligence program may be present in the server 30. In this case, the control circuit 102 accesses the artificial intelligence of the server 30 as necessary and receives necessary information. The control circuit 102 may be constituted by a single CPU or the like, or may be constituted by a plurality of CPUs or the like. Some functions of the control circuit 102 may be performed by software.

The voice input circuit 104 includes a microphone. The voice input circuit 104 acquires a voice outside the central control device 10 through the microphone. Then, the voice input circuit 104 inputs the acquired voice to the voice recognition circuit 106. The voice input circuit 104 may include a circuit or the like for removing a noise from the acquired voice.

The voice recognition circuit 106 recognizes a voice input from the voice input circuit 104. For example, the voice recognition circuit 106 decomposes the input voice and recognizes the voice by comparing the decomposed voice with an acoustic model and a word dictionary stored in the memory 110. Information such as the acoustic model and the word dictionary for voice recognition may not be stored in the memory 110. For example, the information for voice recognition may be present in the server 30.

The voice output circuit 108 includes a speaker. The voice output circuit 108 emits a voice instructed from the control circuit 102 through the speaker.

The memory 110 is a memory such as a flash memory, a hard disk and a solid state drive. Various programs used by the central control device 10 are stored in the memory 110. Information such as the acoustic model and the word dictionary used for voice recognition are also stored in the memory 110. Information for identifying the peripheral device 20 is also stored in the memory 110. The information for identifying the peripheral device 20 is the device name and device type of the peripheral device 20. Furthermore, information about the nominal name of the peripheral device 20 is stored in the memory 110. The information about the nominal name of the peripheral device 20 is information used when the central control device 10 reports a notification or a topic from the peripheral device 20 to the user. The information about the nominal name may be any information such as "PC1," "smartphone 1," "camera 1," and "camera 2," which is easily identifiable by the user. When registering a new peripheral device 20 in the communication system 1, the central control device 10 stores information for identifying the peripheral device 20 and information about the nominal name of the peripheral device 20 in the memory 110. The memory 110 may be single or plural. The memory 110 may not be embedded in the central control device 10. That is, all or part of the memory 110 may be positioned outside the central control device 10.

The communication circuit 112 includes a circuit for allowing the central control device 10 to communicate with an external device. For example, the communication circuit 112 includes a first communication circuit and a second communication circuit. The first communication circuit is, for example, a communication circuit for low power consumption communication such as Bluetooth (registered trademark) Low Energy (BLE). The second communication circuit is, for example, a communication circuit for high capacity communication such as Wi-Fi (registered trademark). Furthermore, the communication circuit 112 may include a communication circuit for cellular phone communication such as a fourth generation (4G) mobile phone line.

Figure 3:
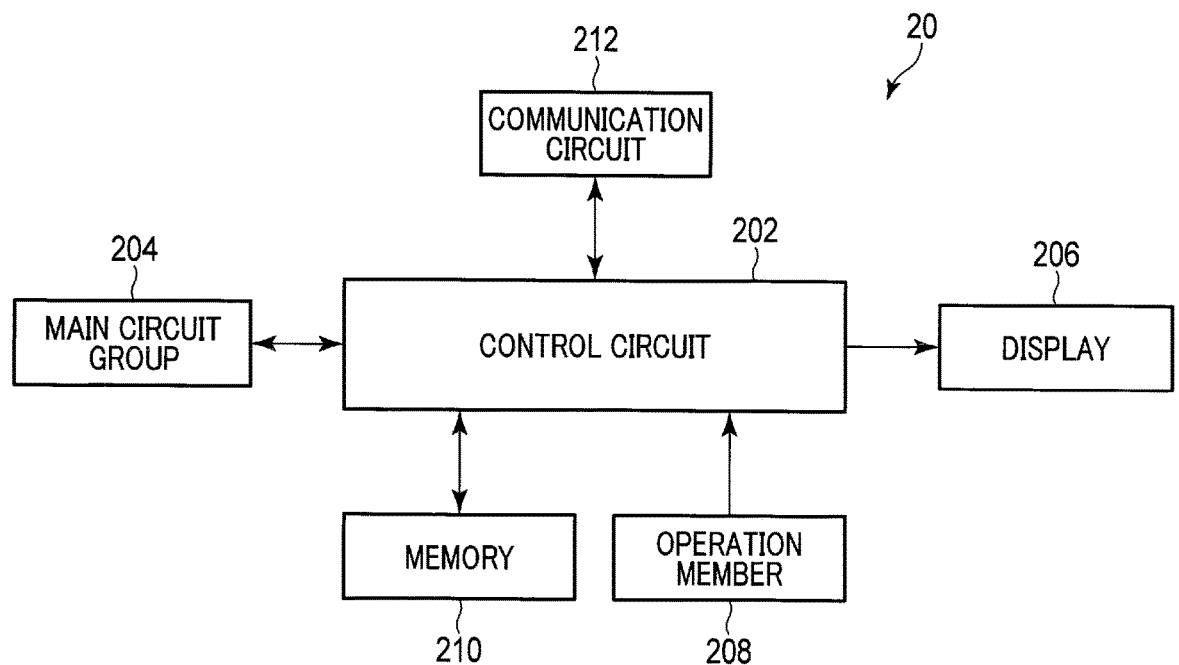
FIG. 3 is a block diagram illustrating a configuration of an example of a peripheral device.

FIG. 3 is a block diagram illustrating a configuration of an example of the peripheral device 20. As illustrated in FIG. 3, the peripheral device 20 includes a control circuit 202, a main circuit group 204, a display 206, an operation member 208, a memory 210, and a communication circuit 212.

The control circuit 202 controls the operation of each block of the peripheral device 20 according to the program stored in the memory 210. The control circuit 202 includes hardware such as a CPU, a GPU, an ASIC, an FPGA, and a main memory. The control circuit 202 may be constituted by a single CPU or the like, or may be constituted by a plurality of CPUs or the like. In addition, some functions of the control circuit 202 may be performed by software. The operations of the control circuit 202 can be performed by different circuits such as an acquisition circuit, an information integration circuit, transmission control circuit.

The main circuit group 204 is a circuit group related to the main function of the peripheral devices 20. Therefore, the main circuit group 204 has different circuit groups according to the type of the peripheral devices 20. For example, when the peripheral devices 20 are digital cameras, the main circuit group 204 includes an imaging element. When the peripheral devices 20 are, for example, televisions, the main circuit group 204 includes a display such as a liquid crystal display. When the peripheral devices 20 are, for example, smart air conditioners, the main circuit group 204 includes a circuit or the like related to cooling and heating.

The display 206 displays various images. The display 206 is a display such as a liquid crystal display or an organic EL display. Depending on the peripheral devices, the display 206 may be omitted. The images are not necessarily displayed on the display 206. For example, the images may be displayed on a television monitor in a position that can communicate with the peripheral devices 20.

The operation member 208 includes a mechanical operation member such as a button, a switch and a dial. The operation member 208 may include a touch panel. For example, the touch panel is provided integrally with the display screen of the display 206.

The memory 210 is a memory such as a flash memory. Various programs used by the peripheral device 20 are stored in the memory 210. The memory 210 may be single or plural. In addition, the memory 210 need not be embedded in each of the peripheral devices 20. That is, all or part of the memory 210 may be positioned outside each of the peripheral devices 20.

The communication circuit 212 includes a circuit for allowing the peripheral devices 20 to communicate with an external device. For example, the communication circuit 212 includes a first communication circuit and a second communication circuit. The first communication circuit is, for example, a communication circuit for low power consumption communication such as BLE. The second communication circuit is, for example, a communication circuit for high capacity communication such as Wi-F.

Next, the outline of the operation of the communication system 1 will be described. As has been described above, a device group varies according to each aspect and situation of various life scenes or each event to be predicted. However, the operation of the communication system 1 will be described simply by clarifying a situation using a simple example. Consider one example of a situation in which a user spends time a little calmly in a room with comfortable temperature after a coffee is served to the user at proper temperature and with optimum timing when air conditioning is linked to a coffee maker or the like.

Figure 4:
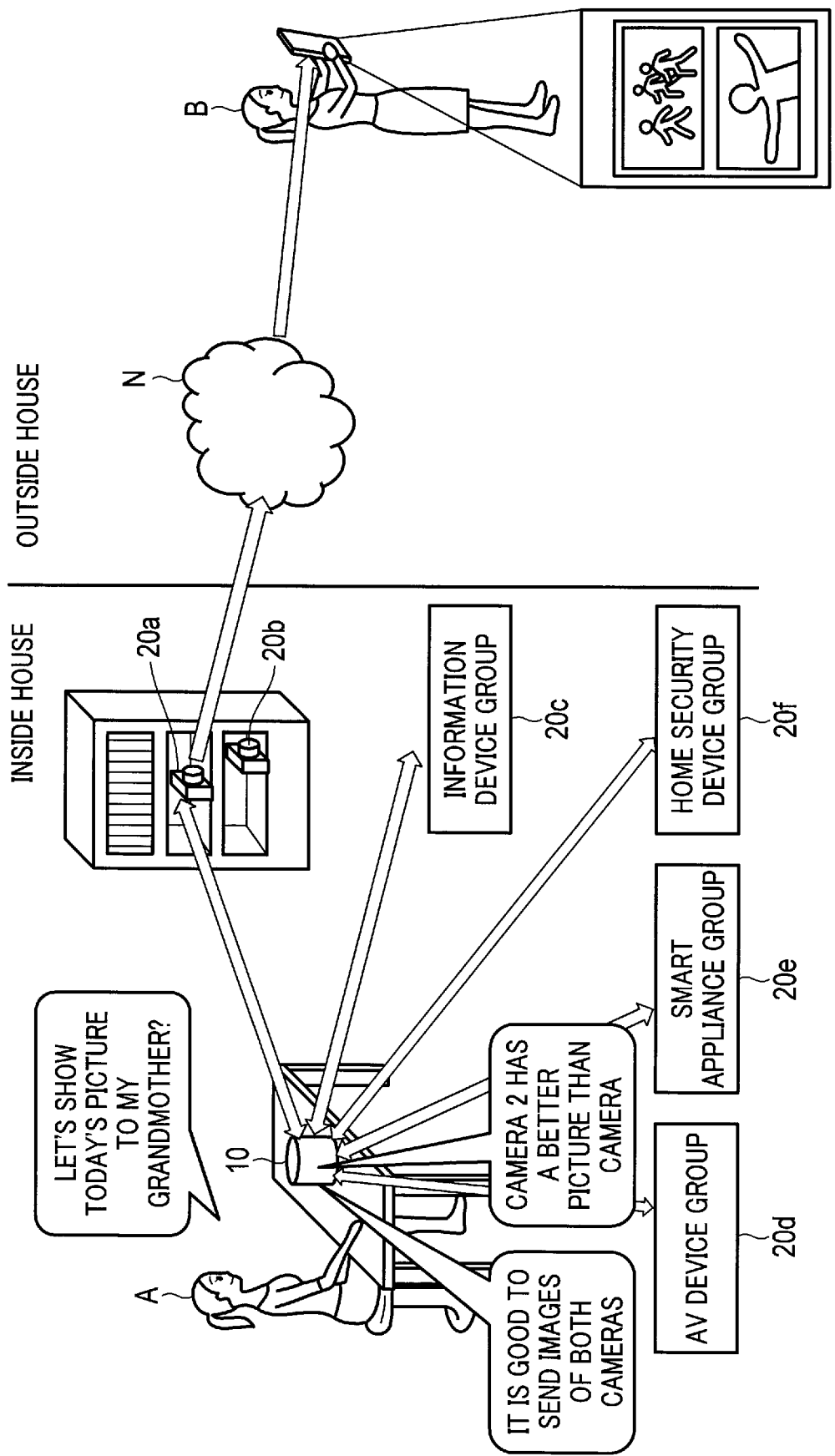
FIG. 4 is a diagram for explaining the outline of a first example of the operation of the communication system.

FIG. 4 is a diagram for describing the outline of a first example of the operation of the communication system 1. In FIG. 4, the communication system 1 is installed in, for example, a user A's house. As illustrated in FIG. 4, the central control device 10 is so disposed that it can communicate with a digital camera 20a, which is one of the peripheral devices 20. A digital camera 20b is provided close to the digital camera 20a. The digital camera 20b is so disposed that it can communicate with the digital camera 20a, and the digital cameras 20a and 20b both belong to an information device group. The group is formed among the same peripheral devices or peripheral devices having related functions or peripheral devices used by the same user. The group is set by, for example, the central control device 10. The central control device 10 is so disposed that it can also communicate with an information device group 20c, an audio and visual device group 20d, a smart appliance group 20e and a home security device group 20f, which are peripheral devices 20 other than the digital cameras 20a and 20b. Assume in the following description that the digital camera 20a is called camera 1 and the digital camera 20b is called camera 2. However, the grouping such as "group" is not a fixed one. For example, in a case where a cleaning robot checks the situation when the intercom rings, another group that exceeds the "group" may be formed, and it has only to be set for each situation. In the following example, a program, a system and a configuration may be provided such that when a user's voice tone for advice is detected, the cleaning robot calls the user's family in another room, but even this situation makes it necessary to link various home appliances to each other across the group by a category and the like, such as checking a family room based on the operating conditions of air conditioners or lighting fixtures and controlling the locking of the room. This situation will, however, be simplified and omitted in the following descriptions.

In a situation as illustrated in FIG. 4, for example, suppose that user A says toward the central control device 10, "Let's show today's picture to my grandmother?" At this time, the central control device 10 interprets the contents of the voice emitted by the user A. Then, the central control device 10 determines correspondence from the interpreted contents of the voice.

In the first embodiment, the peripheral devices that represent a group provide a variety of topics. The peripheral devices are designated in advance for each group by, for example, the central control device 10. The central control device 10 may designate a peripheral device as a representative according to user's instructions, and communicate with each of the peripheral devices in the group to designate a peripheral device with the highest radio field intensity as a representative. In addition, the central control device 10 may choose a representative peripheral device from the peripheral devices that have already been turned on. The central control device 10 may also designate a representative peripheral device for each user. For example, when one of the digital cameras belonging to a group is determined as a representative peripheral device, the central control device 10 may designate a digital camera closer to a smartphone as a representative peripheral device. That is, since the smartphone is likely to be moved by the user, the digital camera close to the smartphone is likely to be carried by the user with the smartphone. Such a digital camera can be designated as a representative peripheral device. If a digital camera close to a smartphone is designated as a representative peripheral device, it is expected that the user will make a proposal as intended more easily.

For example, when the digital camera 20*a* is a representative peripheral device, it checks its own information against the information provided from the digital camera 20*b* and provides it for the central control device 10. That is, the digital camera 20*a* is a peripheral device that communicates with the central control device (smart speaker), and produces a result of communication with other peripheral devices that form a group for each user's situation, as a summary information included in the peripheral device group and including a topic to be provided for the central control device. Then, the digital camera 20*a* includes a control circuit that transmits the summary information to the central control device. FIG. 4 shows a situation in which a user feels relaxed at a table and recollects taking pictures today. This situation can be determined by a smart speaker based upon a time zone, a change in the relationship in position between the user and the smart speaker, a user's voice tone, and an event of the day. When this situation is determined and shared with, for example, a digital camera, the digital camera forms a device group that conforms to the situation. In other words, a device that forms a group depends upon user's potential or manifest needs. The needs can be inferred from the contents of conversations and utterances and the like. For example, information of "images captured today" is included in information that can be provided for the central control device 10 by both the digital cameras 20*a* and 20*b*. The digital camera 20*a* is grouped with photography-related devices to grasp today's "photography" comprehensively and communicates with, for example, the digital camera 20*b* (which may be a smartphone with a photography function) to receive the information of "images captured today." Then, the digital camera 20*a* combines its own information of "images captured today" and the information of "images captured today" provided from the digital camera 20*b* to determine a topic to be finally provided for the central control device 10. When the user wishes to reflect the information on the television, the central control device 10 has only to determine words included in conversations and utterances of "wish to watch" and judge the situation, and link the digital cameras to the television. Furthermore, a system can be used in which a representative device (the digital camera 20*a*) to be linked is chosen by determining a situation by causing the smart speaker to ask the user how the situation is and determining how the user responds to it.

For example, the digital camera 20*a* compares its own information of "images captured today" and the information of "images captured today" provided from the digital camera 20*b* to determine whether the images include images of the same subject. When there are no images of the same subject, the digital camera 20*a* decides to provide the central control device 10 with both the information of "images captured today" of the digital camera 20*a* and the information of "images captured today" of the digital camera 20*b*. On the other hand, when there are images of the same subject, the digital camera 20*a* determines a larger image of the subject as a good image. Then, the digital camera 20*a* provides the central control device 10 with both the information of "images captured today" of the digital camera 20*a* and the information of "images captured today" of the digital camera 20*b* and also provides it with information indicating that the information of "images captured today" of the digital camera 20*b* contains a good image.

The central control device 10 determines to refer to the "information of images captured today" provided from the digital camera 20*a* because user's voice includes the contents of "today's picture". Then, the central control device 10 provides the user A with information such as "it is good to send images of both cameras" and "camera 2 has a better picture than camera 1 today" from the result of referring to the images captured today. When the user A receives the information and provides the central control device 10 with an instruction, the central control device 10 operates in accordance with the instruction from the user A.

For example, when the user A instructs the central control device 10 to "send the pictures of cameras 1 and 2 to the grandma," the central control device 10 issues a command of image transmission to the digital camera 20*a*. Upon receipt of the command, the digital camera 20*a* transmits the images captured today to the grandmother's smartphone as the user B via the network N. The digital camera 20*a* also issues a command of image transmission to the digital camera 20*b*. Upon receipt of the command, the digital camera 20*b* transmits the images captured today to the grandmother's smartphone as the user B via the network N.

Figure 5:
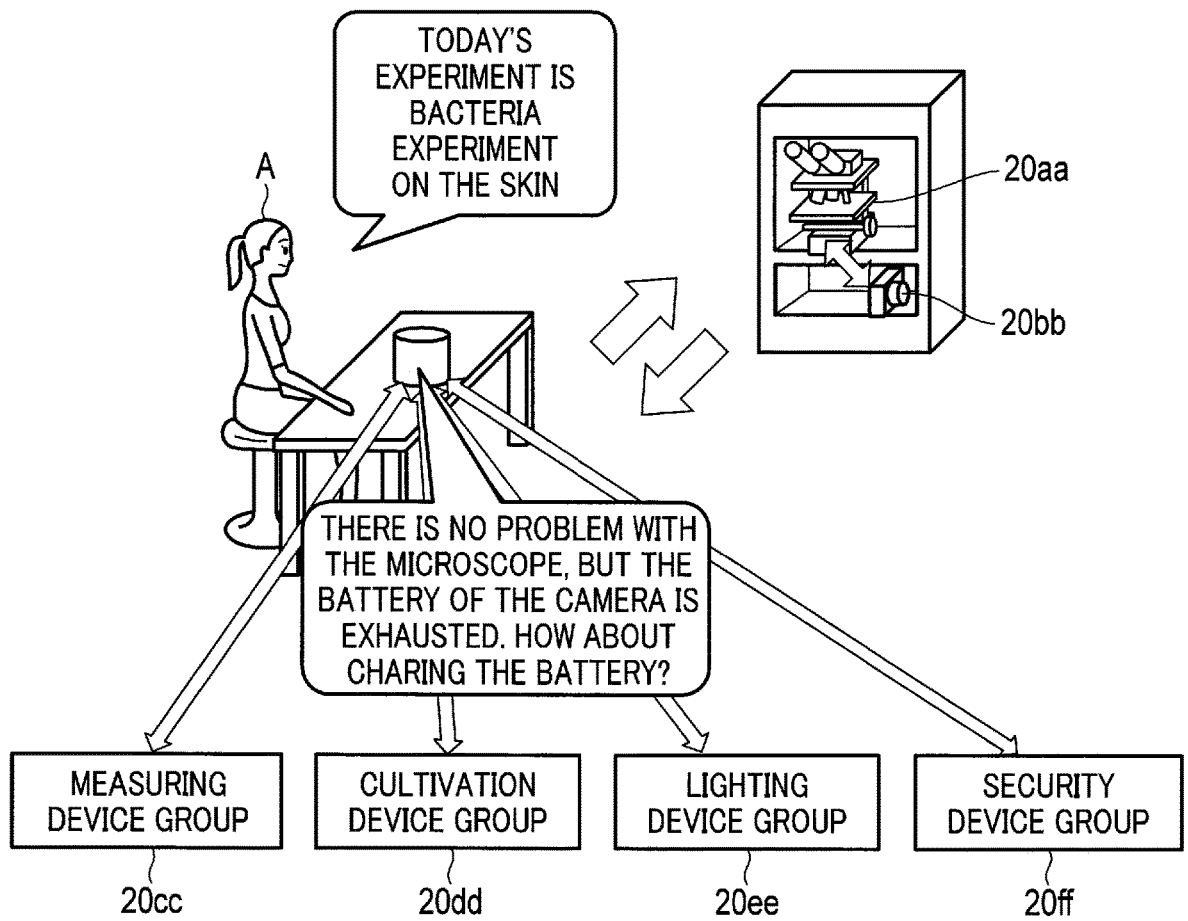
FIG. 5 is a diagram for explaining the outline of a second example of the operation of the communication system.

FIG. 5 is a diagram for explaining the outline of a second example of the operation of the communication system 1. In FIG. 5, the communication system 1 is installed in, for example, a laboratory. As shown in FIG. 5, the central control device 10 is so disposed that it can communicate with a microscope 20*aa* that is one of the peripheral devices 20. A digital camera 20*bb* is also disposed close to the microscope 20*aa* such that it can communicate with the microscope 20*aa*. The microscope 20*aa* and digital camera 20*bb* both belong to a measurement device group. Furthermore, the central control device 10 is so disposed that it can communicate with a measuring device group 20*cc*, a cultivation device group 20*dd*, a lighting device group 20*ee* and a security device group 20*ff*, which are peripheral devices 20 other than the microscope 20*aa* and digital camera 20*bb*.

Assume that in the situation as shown in FIG. 5, for example, the user A says "Today's experiment is bacteria experiment on the skin" to the central control device 10. Then, the central control device 10 interprets the contents of user A's voice. From the interpreted contents of user A's voice, the central control device 10 determines how to deal with the user A's word. If the experiment is on bacteria, the possibility that the microscope 20*aa* will be used is high and thus the central control device 10 designates the microscope 20*aa* as a representative peripheral device.

The microscope 20*aa* designated as a representative peripheral device receives topics from peripheral devices belonging to a predetermined group. For example, the digital camera 20*bb* provides the microscope 20*aa* with a topic in which the battery is currently exhausted. The digital camera 20*bb* would also be used for experiments using the microscope 20*aa*. The microscope 20*aa* thus provides the central control device 10 with the status of the battery of the digital camera 20*bb* as well as the status of its own maintenance as a topic.

The central control device 10 receives the topics from the microscope 20*aa* and says "There is no problem with the microscope, but the battery of the camera is exhausted. How about charging the battery?" This proposal prompts the user A to charge the digital camera 20*bb*. In the example of FIG. 5, the microscope 20*aa* collects the topics after it is designated as a representative peripheral device by the central control device 10. If the battery of the digital camera 20*bb* is exhausted when the microscope 20*aa* is designated as a representative peripheral device, the microscope 20*aa* cannot communicate with the digital camera 20*bb*. To prevent this case, peripheral devices that are not designated as representative ones may be configured to provide information for the representative peripheral device in advance. For example, the digital camera 20*bb* may be configured to provide a topic about the battery for the microscope 20*aa* that is a representative peripheral device when the remaining amount of battery is below a predetermined amount. When no representative peripheral device is predetermined, the digital camera 20*bb* may be configured to provide a topic about the battery for another peripheral device that falls within a communicable range.

As described above, in the first embodiment, the peripheral devices 20 voluntarily provide a "topic" for the central control device 10. The central control device 10 is thus easy to make an appropriate proposal and the like even though it receives no "instructions" from the user. The central control device 10 is also easy to make an appropriate proposal and the like even though it receives words that are not "instructions" such as a mere user's muttering.

Furthermore, in the first embodiment, not the peripheral devices 20 provide a "topic" individually but a representative peripheral device provides a "topic" by integrating information items provided from a plurality of peripheral devices. The "integration" here includes "aggregation" and "summary." Therefore, the possibility that a large number of topics will confuse the determination of the central control device 10 and delays the determination, is prevented.

FIGS. 6A and 6B are diagrams for explaining information transmission between the central control device 10 and each of the peripheral devices 20 in the first embodiment. In the first embodiment, the information transmission between the central control device 10 and each of the peripheral devices 20 is largely divided into two types. FIGS. 6A and 6B show an example of information transmission in the communication system 1 shown in FIG. 4. In the communication system 1 shown in FIG. 5, too, two types of information transmission similar to the information transmission shown in FIGS. 6A and 6B are performed.

The first information transmission is intended to cause a peripheral device 20 to perform a predetermined operation in response to user's instructions. In the first information transmission, a command based upon the user's instructions is transmitted to the peripheral device 20 from the central control device 10. The peripheral device 20 operates according to the command transmitted from the central control device 10.

The second information transmission is intended to provide a topic for the central control device 10 or the user. In the second information transmission, the peripheral device 20 transmits information to the central control device 10 to provide a topic. In the information transmission shown in FIGS. 6A and 6B, each peripheral device can provide information as a topic. As described above, in the second information transmission, information items are integrated in advance among the peripheral devices. Therefore, the information finally transmitted to the central control device 10 varies with the contents of the integration. The topic to be provided as the second information transmission indicates what type of device the peripheral device 20 is and what it can do. This topic includes information for the "proposal" to the central control device 10 or the user, which is related to at least one of information about the current status of the peripheral device 20 and information about the function of the peripheral device 20. In the second information transmission, the central control device 10 makes various determinations using information transmitted from the peripheral device 20. Then, the central control device 10 makes a proposal by, e.g. voice to the user if necessary, controls the peripheral device 20, or stores information for another determination to be made later. Thus, the use of information to provide a topic to be transmitted in the second information transmission is determined by the central control device 10.

In FIG. 6A, a PC, a smartphone, a digital camera and a voice recorder are each taken as an example of the information device group.

As the first information transmission between the central control device 10 and the PC, the central control device 10 issues a command to the PC based on user's instructions such as turning on or off the power and activating or terminating an application.

As the second information transmission between the central control device 10 and the PC, the PC transmits information such as a report of a user's schedule, a report of unused applications, a proposal for reproduction of specific contents and a proposal for sharing of specific contents. The contents here are an image, video or voice. Note that the video here means a movie picture. The "sharing" means sharing information with other peripheral devices.

As the first information transmission between the central control device 10 and the smartphone, the central control device 10 issues a command to the smartphone based on user's instructions such as turning on or off the power and activating or terminating an application.

As the second information transmission between the central control device 10 and the smartphone, the smartphone transmits information such as a report of a user's schedule, a report of unused applications, a proposal for reproduction of specific contents and a proposal for sharing of specific contents.

As the first information transmission between the central control device 10 and the digital camera, the central control device 10 issues, to the digital camera, a command based on user's instructions such as turning on or off the power, starting or terminating photographing, reproducing or terminating an image and making various settings.

As the second information transmission between the central control device 10 and the digital camera, the digital camera transmits information such as a proposal for charging, a proposal for memory exchange, images captured today, previously captured images, a proposal for reproduction of specific images, a proposal for sharing of specific images, a proposal for editing of specific images and a proposal for organization of specific images.

The information about the images captured today includes, for example, information such as the presence or absence of images captured today, the total number of images captured today, the number of snapshots in the images captured today, the number of group photographs in the images captured today, the number of landscape photographs in the images captured today, the number of moving images in the images captured today, and the number of failed images in the images captured today.

The information about the images captured up to now is history information about the images captured so far by the user. The information about the images captured up to now includes, for example, information such as the cumulative number of images captured so far, the cumulative number of snapshots, the cumulative number of group photographs, the cumulative number of landscape pictures, the cumulative number of moving images, and the cumulative number of failed images. The specific image suggested for reproduction is an image captured today, an image with a small number of times of reproductions, an image tagged with a favorite setting by the user, and the like. The specific image suggested for sharing is an image captured today, a group photograph, an image which has never been shared, and the like. The specific image suggested for editing is an unedited voice, an image with a small number of times of reproductions, and the like. The specific image suggested for organization is a failed image, a duplicated image, and the like.

As the first information transmission between the central control device 10 and the voice recorder, the central control device 10 issues a command to the voice recorder based on user's instructions such as turning on or off the power, starting or terminating recording, reproducing or terminating voice, and making various settings.

As the second information transmission between the central control device 10 and the voice recorder, the voice recorder transmits information such as a proposal for charging, a proposal for memory exchange, voices recorded today, voices recorded so far, a proposal for reproduction of specific voices, a proposal for sharing of specific voices, a proposal for editing of specific voices, and a proposal for organization of specific voices.

The specific voice suggested for reproduction is a voice recorded today, a voice with a small number of times of reproductions, a favorite voice tagged with a favorite setting by the user, and the like. The specific voice suggested for sharing is a voice recorded today, a voice that has never been shared, and the like. The specific voice suggested for editing is an unedited voice, a voice with a small number of times of reproductions, and the like. The specific voice suggested for organization is a failed voice, a duplicated voice, and the like.

In FIG. 6A, a television, an audio device and a recording device are each taken as an example of the audio and visual device group.

As the first information transmission between the central control device 10 and the television, the central control device 10 issues a command to the television based on user's instructions such as turning on or off the power, changing a channel, displaying a program table, and making various settings.

As the second information transmission between the central control device 10 and the television, the television transmits information such as a proposal for a recommendation program.

As the first information transmission between the central control device 10 and the audio device, the central control device 10 issues a command to the audio device based on user's instructions such as turning on or off the power, starting or terminating music reproduction, and making various settings.

As the second information transmission between the central control device 10 and the audio device, the audio device transmits information such as a proposal for recommendation of music and a proposal for reproduction of music to which the user has not listened.

As the first information transmission between the central control device 10 and the recording device, the central control device 10 issues a command to the recording device based on user's instructions such as turning on or off the power, starting or terminating video production, and making various settings.

As the second information transmission between the central control device 10 and the recording device, the recording device transmits information such as a proposal for recommended programs and a proposal for reproduction of unviewed video.

In FIG. 6B, a refrigerator, an air conditioner, a vacuum cleaner, a toilet and a lighting device are each taken as an example of the smart appliance group.

As the first information transmission between the central control device 10 and the refrigerator, the central control device 10 issues a command to the refrigerator based on instructions such as confirmation of stored items, recipe display using ingredients in the refrigerator, and various settings.

As the second information transmission between the central control device 10 and the refrigerator, the refrigerator transmits information such as information about the stored items and proposal for today's menu.

As the first information transmission between the central control device 10 and the air conditioner, the central control device 10 issues a command to the air conditioner based on user's instructions such as turning on or off the power, changing temperature, and making various settings.

As the second information transmission between the central control device 10 and the air conditioner, the air conditioner transmits information such as a proposal for use of air conditioner accompanying a change in temperature and a proposal for a change in temperature.

As the first information transmission between the central control device 10 and the vacuum cleaner, the central control device 10 issues a command to the vacuum cleaner based on user's instructions such as starting or terminating cleaning and making various settings.

As the second information transmission between the central control device 10 and the vacuum cleaner, the vacuum cleaner transmits information such as a proposal for start of cleaning to the central control device 10. As the first information transmission between the central control device 10 and the lighting device, the central control device 10 issues a command to the lighting device based on user's instructions such as turning on or off the power and making various settings. As the second information transmission between the central control device 10 and the lighting device, the lighting device transmits information such as a proposal for brightness adjustment to the central control device 10.

In FIG. 6B, an intercom, a surveillance camera and an electronic lock are each taken as an example of the home security device group.

As the first information transmission between the central control device 10 and the intercom, the central control device 10 issues a command to the intercom based on instructions such as turning on or off the display of external video, starting and terminating the reproduction of recorded images, and making various settings.

As the second information transmission between the central control device 10 and the intercom, the intercom transmits information such as a proposal for the reproduction of recorded images to the central control device 10.

As the first information transmission between the central control device 10 and the surveillance camera, the central control device 10 issues a command to the surveillance camera based on instructions such as turning on or off the power, starting or terminating the reproduction of video, and making various settings.

As the second information transmission between the central control device 10 and the surveillance camera, the surveillance camera transmits, to the central control device 10, information such as a proposal for the reproduction of recorded video.

As the first information transmission between the central control device 10 and the electronic lock, the central control device 10 issues a command to the electronic lock based on instructions such as locking or unlocking.

As the second information transmission between the central control device 10 and the electronic lock, the electronic lock transmits information such as a proposal for maintenance to the central control device 10.

Here, the contents of the first information transmission and the second information transmission illustrated in FIGS. 6A and 6B are one example. In the first information transmission and the second information transmission, elements other than those illustrated in FIGS. 6A and 6B may be included, and some of the elements illustrated in FIGS. 6A and 6B may be excluded.

Figure 7:
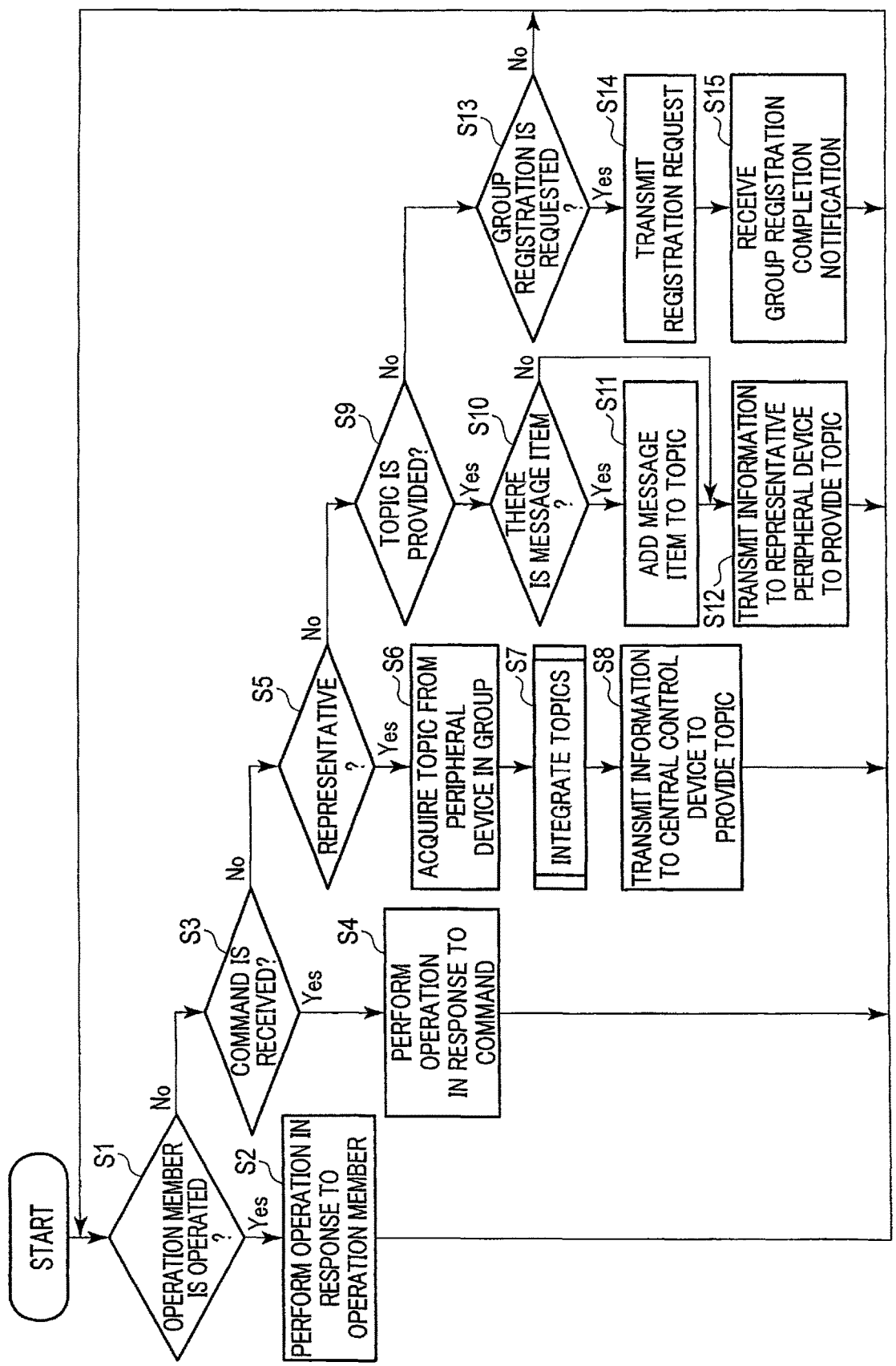
FIG. 7 is a flowchart showing the operation of the peripheral device in the first embodiment.

Next, the operation of the communication system 1 will be described. FIG. 7 is a flowchart showing the operation of the peripheral device 20 in the first embodiment. The operation shown in FIG. 7 is controlled by the control circuit 202 of the peripheral device 20. The operation shown in FIG. 7 may be performed in both cases where the peripheral device 20 is powered on and powered off.

In step S1, the control circuit 202 determines whether the operation member 208 is operated by the user. When it is determined in step S1 that the operation member 208 is operated by the user, the process proceeds to step S2. When it is determined in step S1 that the operation member 208 is not operated by the user, the process proceeds to step S3.

In step S2, the control circuit 202 performs an operation corresponding to the operation member 208 operated by the user. After the operation is performed, the process returns to step S1. The operation corresponding to the operation member 208 is, for example, the power-on of the peripheral device 20 accompanying the on-operation of the power switch or the power-off of the peripheral device 20 accompanying the off-operation of the power switch. In addition, the operation corresponding to the operation member 208 is an operation of various settings according to the operation of the operation member 208.

In step S3, the control circuit 202 determines whether it has received a command from the central control device 10. When it is determined in step S3 that the control circuit 202 has received a command from the central control device 10, the process proceeds to step S4. When it is determined in step S3 that it receives no command from the central control device 10, the process proceeds to step S5.

In step S4, the control circuit 202 performs an operation corresponding to the command. After the operation is performed, the process returns to step S1. The operation corresponding to the command is the power-on of the peripheral device 20 accompanying the power-on command or the power-off of the peripheral device 20 accompanying the power-off command as illustrated as the first information transmission in FIGS. 6A and 6B. In addition, the operation corresponding to the command is various setting operations as illustrated as the first information transmission in FIG. 6A and FIG. 6B.

In step S5, the control circuit 202 determines whether or not the peripheral device 20 is currently designated as a representative one. For example, when it is designated as a representative one by the central control device 10 or the user, the control circuit 202 determines that it is currently designated as a representative one. Further, for example, even if the peripheral device 20 is required to be a representative one from another peripheral device, the control circuit 202 determines that it is currently designated as a representative one. Furthermore, for example, a representative peripheral device may be configured to be switched to another one in a group for each predetermined period. In this case, the control circuit 202 determines that it is currently designated as a representative one when a predetermined period has elapsed. When the control circuit 202 determines in step S5 that the peripheral device 20 is currently designated as a representative one, the process proceeds to step S6. When the control circuit 202 determines in step S5 that it is not currently designated as a representative one, the process proceeds to step S9.

In step S6, the control circuit 202 communicates with another peripheral device belonging to the same group to acquire a topic. In step S7, the control circuit 202 integrates the topic acquired from the peripheral device and its own topic to generate a topic to be provided for the central control device 10. In step S8, the control circuit 202 transmits topic information including the generated topic to the central control device 10 using the communication circuit 212. The topic information includes information for providing the topic. Then, the process returns to step S1. Step S7 will be described in detail later.

In step S9, the control circuit 202 determines whether to provide a topic. For example, the control circuit 202 determines to provide a topic when it is required to acquire a topic from a representative peripheral device and there is a topic to be provided at the present time. For example, when the peripheral device 20 is a digital camera, the control circuit 202 makes various determinations such as whether the remaining battery amount is smaller than a predetermined one, whether the memory capacity is smaller than a predetermined one, whether there is an image captured today, whether there is an image targeted for a proposal for reproduction, whether there is an image targeted for a proposal for sharing, whether there is an image targeted for a proposal for editing, and whether there is an image targeted for a proposal for organization. Then, when any one of the conditions is satisfied, the control circuit 202 determines that there is a topic to be currently provided. In step S9, when the control circuit 202 determines to provide a topic, the process proceeds to step S10. In step S9, when it determines not to provide a topic, the process proceeds to step S13.

Note that in step S9, when there is a topic to be provided even though the control circuit 202 is not requested to acquire a topic by a representative peripheral device, the control circuit 202 may determine that a topic is provided. For example, when the peripheral device 20 has a voice recognition function, the control circuit 202 may determine the presence or absence of a topic to be provided in accordance with user's voice without using the representative peripheral device 20 or the central control device 10. When the control circuit 202 determines the presence or absence of a topic to be provided in accordance with user's voice, a destination provided with the topic is not the representative peripheral device but may be the central control device 10. In addition, when there is a topic to be provided urgently, the control circuit 202 may determine that a topic is provided. For example, in the case of a peripheral device whose remaining battery amount is small, there is a possibility that a topic cannot be provided if the control circuit 202 waits for the representative peripheral device to request the control circuit 202 to acquire a topic. In this case, the control circuit 202 may determine that a topic is provided even though the representative peripheral device 20 does not request the control circuit 202 to acquire a topic.

In step S10, the control circuit 202 determines whether there is a "message item" to the representative peripheral device 20. The "message item" is information that is to be considered in the integration process of a topic in the representative peripheral device 20. For example, the message item includes a request for the representative peripheral device 20, such as transmitting information of the provided topic to the central control device 10 without being changed. If the peripheral device 20 is, for example, a digital camera, the message item includes information concerning a function of a peripheral device to be claimed for the central control device 10 or the user, such as that the "information of images captured so far" includes images seen by the user a number of times and a number of images captured at a particular location. Furthermore, if the peripheral device 20 is a digital camera, the message item includes information concerning of an image that may invade individual privacy in the "information of images captured today" or "information of images captured so far." When the control circuit 202 determines in step S10 that there is a message item, the process proceeds to step S11. When it determines in step S10 that there is no message item, the process proceeds to step S12.

In step S11, the control circuit 202 adds the message item to the topic. Then, the process proceeds to step S12. For example, the message item is related to each topic.

In step S12, the control circuit 202 transmits the topic information including the generated topic to the representative peripheral device 20 using the communication circuit 212. Then, the process returns to step S1.

In step S13, the control circuit 202 determines whether it is requested to register a group. For example, when the control circuit 202 receives an inquiry about the registration of a group from the central control device 10 and when the group has not been registered, it determines that it is requested to register the group. When the control circuit 202 determines in step S13 that it is requested to register a group, the process proceeds to step S14. When the control circuit 202 determines in step S13 that it is not requested to register a group, the process returns to step S1.

In step S14, the control circuit 202 transmits the request for group registration using the communication circuit 212. In step S15, the control circuit 202 receives a group registration completion notification from the central control device 10. Then, the process returns to step S1.

Figure 8:
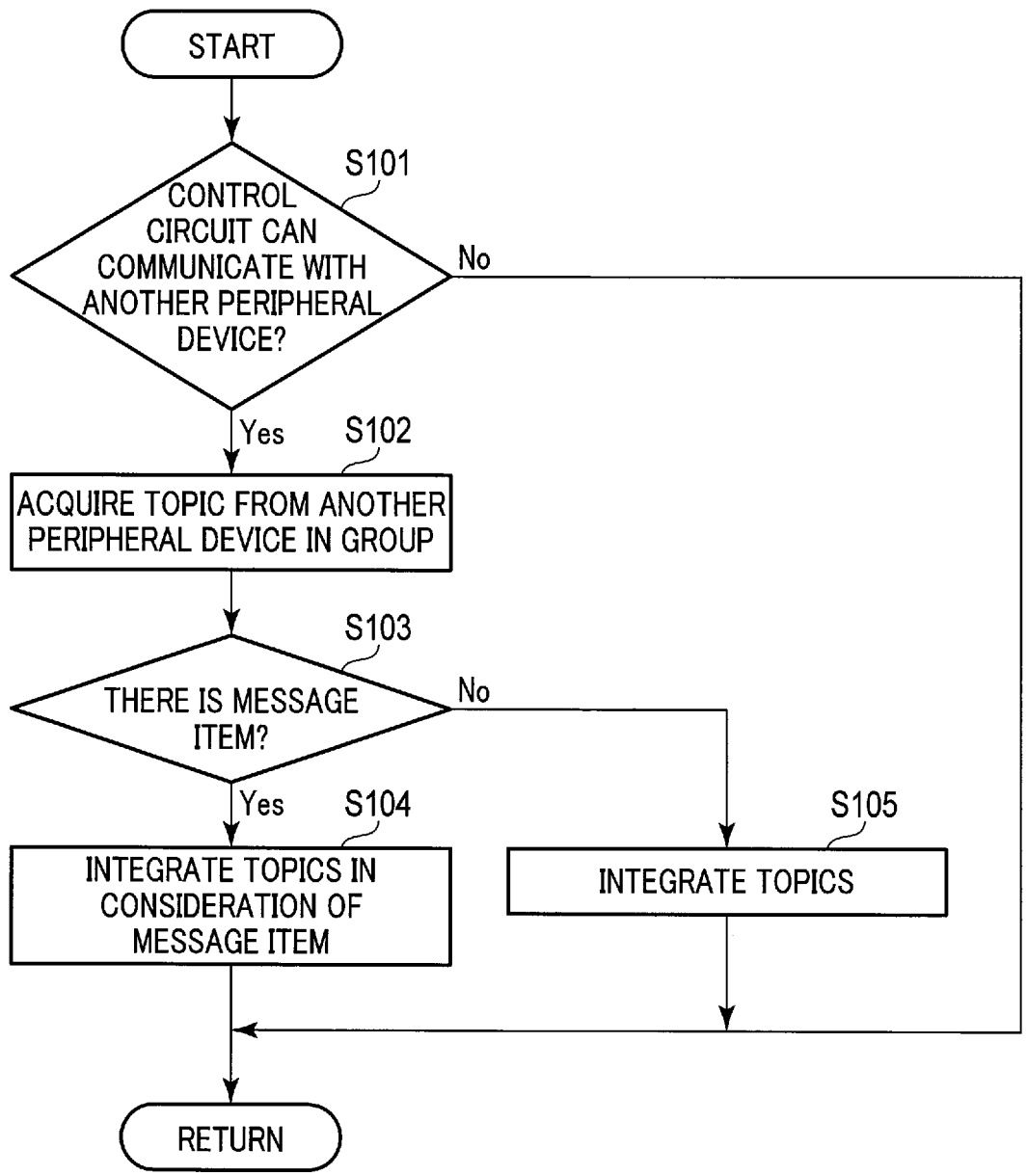
FIG. 8 is a flowchart illustrating an integration process.

FIG. 8 is a flowchart illustrating the topic integration process in step S7 of FIG. 7. In step S101, the control circuit 202 determines whether it can communicate with another peripheral device 20 belonging to the group. When it determines in step S101 that it can communicate with the peripheral device 20, the process proceeds to step S102. When it determines in step S101 that it cannot communicate with the peripheral device 20, the process of FIG. 8 is terminated.

In step S102, the control circuit 202 acquires topic information including a topic from another peripheral device 20 using the communication circuit 212. In step S103, the control circuit 202 determines whether the acquired topic information contains a message item. When the control circuit 202 determines in step S103 that it contains a message item, the process proceeds to step S104. When the control circuit 202 determines in step S103 that it does not contain a message item, the process proceeds to step S105.

In step S104, the control circuit 202 integrates the topic information acquired from another peripheral device and its own topic information in consideration of the message item. In step S105, the control circuit 202 integrates the topic information acquired from another peripheral device and its own topic information without considering the message item. After step S104 or step S105, the process of FIG. 8 is terminated.

Below is a description of the topic integration (which may be expressed as aggregation or a summary). The "integration" may include a user state, and it can be considered that the method of "integration" of device information varies according to a user state. The topic integration allows comprehensive information to be provided for a user by checking a plurality of topics. The topic integration includes analogizing the user state and user behavior in a specific event to generate a topic adapted thereto and combining a plurality of topics to generate an exact topic on a plurality of peripheral devices from a single peripheral device. As one example, the topic integration performed when the peripheral device is a digital camera will be described. Especially under the situation where a user's hobby is photography and a photography event is approaching, it is desirable to use a digital camera as a representative peripheral device to output push-type information initiatively and meet the needs of the user in the smart environment (IoT or network cooperation environment). This is because the digital camera is a device that records various items of information about photography and a device that has the largest number of items of information about what photography the user enjoys. In other words, the representative peripheral device is changed by, for example, the user situation or judgment. This change is controlled by the contents of a recording medium, information specified from outside, and the like. In the example of air conditioning other than the photography, for example, an air conditioner may be a representative peripheral device.

The "representative peripheral device (information terminal, information appliance, etc.)" often includes a sensor and the like that conform with its dedicated function. The representative peripheral device also often records information of operating states of the dedicated function more than other devices. The dedicated function is effectively utilized in, for example, determination of the foregoing user state or judgment. In most cases, the information recorded in the device is not shared with an external device because it is more advantageous in terms of security to complete the information in the device. These peripheral devices are therefore suitable to transmit effective information using their unique information and an electronic circuit such as a dedicated sensor. Also, they easily exchange information about similar situations and similar data with products, accessories and the like in similar categories. This is due to the background in which the use of similar devices makes it easy to have data standardized by an industry group. That is, the control circuit including such a device may include an information retrieval circuit that retrieves information requested by a smart speaker from information of the device and that of its associated external device. The control circuit may voluntarily transmit necessary information with specific timing. This specific timing is, for example, time of relaxation for the user, which is estimated from the daily life pattern. Alternatively, the specific timing is, for example, timing with which the user lifted the peripheral device. The timing with which the peripheral device is lifted can be determined from an acceleration sensor or the like provided in the peripheral device. The timing is also considered to be a situation in which the user clears the peripheral device and a situation the user tries to use the peripheral device. This timing is thus suitable as timing of information dissemination. If, however, the user enters another room to clear the peripheral device, he or she does not hear the voice of the smart speaker; thus, the timing is not strictly the timing with which the peripheral device is lifted, but may be timing before and after it is lifted. The suitable timing can be determined from the voice information by the smart speaker. It may also be determined as timing of information transmission when a user's face and a specific expression such as a smile are detected using an image sensor with the information terminal. Also, timing with which the user approaches, which is determined from his or her footsteps acquired by, e.g. a microphone of the information terminal or timing with which the user catches hold of the peripheral device, which is determined from the rubbing sound or the like of the peripheral device, acquired by, e.g. the microphone, may be determined as timing of information transmission. As for consumption information of a battery, a memory and the like, the timing with which they are detected may be determined as timing of information transmission.

As described above, the peripheral devices of the first embodiment select first information and second information according to user's situation or determination and integrate the selected first information and second information, which can contribute to communications with the most appropriate user at that time. That is, the information device is an information terminal that communicates with the smart speaker, which includes a transmission control circuit that integrates first information including a topic to be provided for the smart speaker, which is transmitted from an external device and an accessory having a related function and second information of the information terminal to generate third information and transmits the third information. The information transmission timing is not necessarily limited to the time when the smart speaker collects information for sounding or need not match the timing with which the smart speaker makes sound. The information from the peripheral devices may be transmitted in advance to the smart speaker such that the smart speaker can transmit information.

Figure 9A:
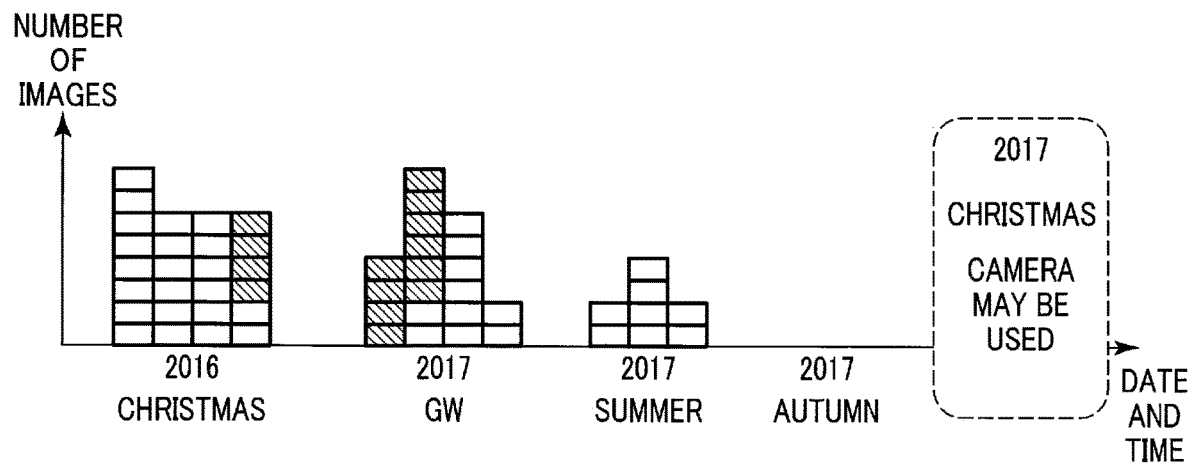
FIG. 9A is a diagram illustrating an example of an imaging history of a user.
Figure 9B:
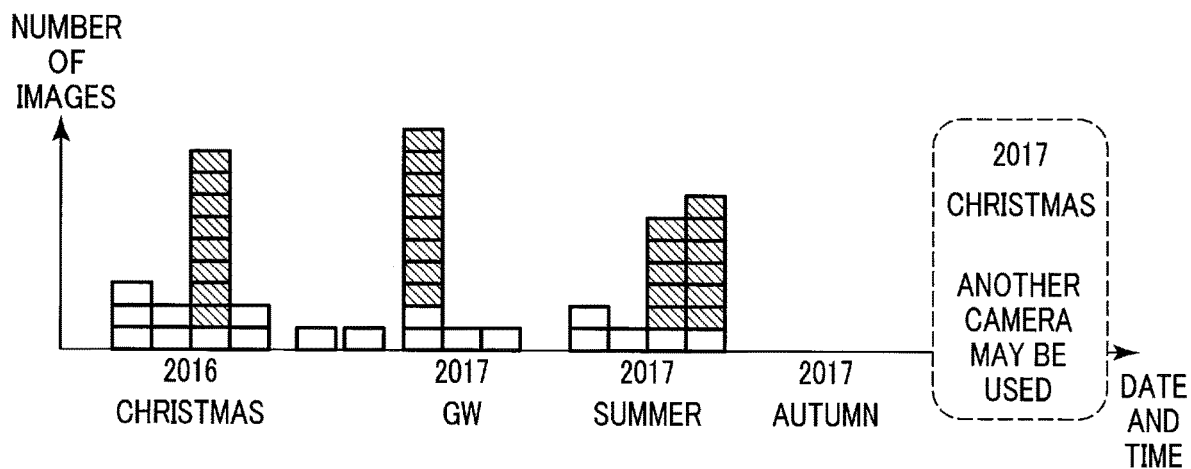
FIG. 9B is a diagram illustrating an example of an imaging history of a user.

FIGS. 9A and 9B show examples of a user photography's history determined from the "information about images captured so far." In FIGS. 9A and 9B, the horizontal axis indicates the photography date and time, and the vertical axis indicates the number of images captured by the user. The number of images that are not hatched in FIGS. 9A and 9B corresponds to the number of images captured by a digital camera (camera 1) designated as a representative, and the number of images that are hatched in FIGS. 9A and 9B corresponds to the number of images captured by another digital camera (camera 2) that is not designated as a representative.

It is seen from FIG. 9A that the user captures images intensively using the camera 1 during the consecutive holidays such as a winter vacation, Golden Week (GW) holidays and a summer vacation. Even during the consecutive holidays, the user does not capture images so often using the camera 2 (second peripheral device). It can be determined from the photography's histories (first information and second information) of a plurality of digital cameras that the user is very likely to capture images using the camera 1 when the photography date is Christmas in the tendency as shown in FIG. 9A. In this situation, it is more significant to suggest the use of the camera 1 (itself) rather than to suggest the use of the camera 2. Therefore, the control circuit 202 of the representative digital camera decides to provide the central control device 10 with a proposal for the use of the camera 1 (itself) as a topic. On the other hand, the control circuit 202 decides not to provide the central control device 10 with a proposal for the use of the camera 2 as a topic.

However, when a request to provide a proposal for the use of the camera 2 as a topic is made as a message item, the control circuit 202 decides to provide the central control device 10 with a proposal for the use of the camera 2. Priority may be given to the message item. In this case, the control circuit 202 may decide how much a topic from another peripheral device should be considered in accordance with the priority of the message item. For example, higher priority is given to a topic to be handled on a priority basis, such as occurrence of an error. Regarding the topic to be handled on a priority basis, the control circuit 202 determines that it is provided for the central control device 10.

The control circuit 202 generates topic information based on the topic that has been determined as one to be provided. The topic information may include identification information indicating which peripheral device in the group provides topics that are integrated into a topic. The identification information includes information indicating a peripheral device that has provided the integrated topics. The information indicating the peripheral device is, for example, an ID of the peripheral device.

Furthermore, in FIG. 9B, the user captures images with the camera 1 not only during the consecutive holidays but also on average, but the number of captured images is small. If, however, the number of images captured by the camera 1 and the number of images captured by the camera 2 are compared with each other, it is seen that the user captures more images using the camera 2 during the consecutive holidays as in the case of FIG. 9A. It can thus be determined from the photography's histories of a plurality of digital cameras that the user is very likely to capture images using the camera 2 when the photography date is Christmas in the tendency as shown in FIG. 9B. The control circuit 202 thus decides to provide the central control device 10 with a proposal for the use of the camera 2 as a topic.

As described above, the information of "images captured so far" is said to be information indicating the past user photography's history and information about user behavior. Similarly, the information of "images captured today" is said to be information indicating a user photography's history on the day and information about user behavior on the day. From these items of information, the tendency and preference to the user's photographing can be inferred. If the tendency and preference can be inferred, an appropriate proposal can be made to the user. If, furthermore, information items about the behavior of a plurality of users are combined, it is expected to understand the tendency and preference of the user, which are not known from only the information of a single peripheral device. Thus, another (second) peripheral device that acquires the second information may be changed by the user's situation or judgment. This change is controlled by the control circuit in accordance with the contents of a recording unit of the first peripheral device and information specified from an external device such as a smart speaker. The first information and second information are a photography's history in this example. In addition, GPS information indicating information such as what scene was photographed and where it was done, the remaining amount of a battery and a memory, etc. are also candidates for the first information and second information. Information to be effectively utilized varies with from situation to situation. Therefore, the control circuit may change the information selecting and integrating method according to user's situation or judgment. The control circuit may also select and integrate information in accordance with user's instructions to change the method.

Note that FIGS. 9A and 9B illustrate examples in which a user behavior is inferred by combining information items of the two digital cameras. The user behavior related to the use of a digital camera does not always need to be obtained from the digital camera only. For example, when the fact that an image of a digital camera are viewed a large number of times using a television is seen from the topic information, the control circuit 202 may determine to provide a proposal for reproduction of the image and a proposal for power-on of the television as a topic. The number of times the image of the digital camera is viewed using the television is obtained, for example, by counting in the television the number of times the image is transferred from the digital camera to the television. If, furthermore, the user drinks coffee with high frequency during the viewing of images, the control circuit 202 may also determine to provide a proposal for the use of a coffee maker as a topic. The correlation between the viewing of images and the drinking of coffee is obtained by acquiring the place and time in which the images are viewed from the digital camera and also acquiring the place and time in which the coffee is made from the coffee maker. In other words, if the place and time in which the images are viewed and the place and time in which the coffee is made substantially coincide with each other, it is estimated that the user drinks coffee during the viewing of the images. The viewing of images and the frequency of drinking of coffee seem to be unrelated to each other. If, however, they are integrated as information in one group, a user behavior may be inferred. For example, when a topic that a user purchased a plane ticket is provided from a smart phone or a topic that a user closed the window in the daytime from a security device, the control circuit 202 may decide to provide the central control device 10a with a proposal for the mobility of the camera as a topic because the user is likely to be out for a long time. If, furthermore, a user's itinerary is clear, the control circuit 202 may determine how many pictures are taken by the user from the itinerary based on the information of "images captured so far" collected from a plurality of digital cameras and determine whether there is a necessary battery remaining amount and there is a memory remaining amount to take pictures. In this case, the control circuit 202 suggests both on the use of the camera and on the remaining battery amount and the remaining memory amount.

The inference of user behaviors described above is accompanied with a very complex judgment. The control circuit 202 may be configured to infer behaviors by artificial intelligence. In this case, from the conditions obtained from learning such as machine learning and deep learning, the control circuit 202 finds relevance to, e.g. user behavior in a plurality of information items collected in the representative peripheral device. Then, the control circuit 202 generates a topic corresponding to the found relevance.

In addition, when the battery remaining amount or memory remaining amount of the representative peripheral device 20 does not decrease and when another peripheral device 20 provides a decrease in battery remaining amount or memory remaining amount as a topic, the control circuit 202 of the representative peripheral device 20 decides to provide as a topic that its own battery remaining amount or memory remaining amount does not decrease but the battery remaining amount or memory remaining amount of the other peripheral device 20 decreases. The topics on the decrease in the battery remaining amount and the decrease in the memory remaining amount can be generated by only a single peripheral device 20. Since, however, no communication can be carried out if the battery goes dead, it is significant to keep information in another peripheral device 20 before the battery goes dead.

Topics that compete among a plurality of peripheral devices may also be provided. In this case, the control circuit 202 provides each of the topics for the central control device 10 as it is. In this case, the central control device 10 makes a final decision as to which topic is provided for a user. The central control device 10 compares the respective topics and selects a topic most suitable for the user.

If, furthermore, the direction in which a topic is provided is given by a user, the control circuit 202 may generate a topic according to the direction of the topic given by the user from the collected topics. For example, if the user designates health information such that it is emphasized, the control circuit 202 generates a number of topics related to health. The central control device 10 may also change the representative peripheral device 20 in accordance with the direction of the topic given by the user.

If the topics of the peripheral devices are integrated as described above, a topic corresponding to user's preference or the like is generated rather than a topic generated from only the information of a single peripheral device.

FIG. 10 is a flowchart showing the operation of the central control device 10 in the first embodiment. The operation shown in FIG. 10 is controlled by the AI assistant achieved by the control circuit 102 or the like of the central control device 10.

In step S201, the AI assistant determines whether user's voice is input. When it is determined in step S201 that user's voice is input, the process proceeds to step S202. When it is determined in step S201 that no user's voice is input, the process proceeds to step S203. A specific activation word may be set in the central control device 10. In this case, in step S201, the AI assistant may not receive other voice inputs until the user issues an activation word. In step S201, the AI assistant may not receive voice inputs other than those registered in advance.

In step S202, the AI assistant recognizes the input voice and performs an operation corresponding to the recognized voice. After that, the process returns to step S201. If the input voice includes an instruction to the peripheral device 20, the AI assistant transmits a command corresponding to the instruction to the corresponding peripheral device 20 using the communication circuit 112. If the input voice includes an instruction to reproduce a specific piece of music, the AI assistant reproduces the music from the voice output circuit 108 while searching the Internet as necessary. If the input voice includes an instruction to reproduce news, the AI assistant reproduces the news from the voice output circuit 108 while searching the internet as necessary. If necessary, the AI assistant may determine a correspondence using both the contents of the user's voice and topic information provided from the peripheral device 20. For example, as illustrated in FIG. 4, the AI assistant may respond to user's words that "Let's show today's picture to my grandmother?" using "information about images captured today" provided from the digital camera.

In step S203, the AI assistant determines whether to register a new peripheral device from the peripheral devices 20 in a group. For example, the AI assistant inquires of the peripheral device 20 using the communication circuit 112. When it is determined that the AI assistant has received a request to register a group from the peripheral device 20, the process proceeds to step S204. When it is determined in step S203 that the AI assistant does not receive a request to register a group from the peripheral device 20, the process proceeds to step S205.

In step S204, the AI assistant registers a group of the peripheral devices 20 using the communication circuit 112. For example, the AI assistant specifies the type and function of a peripheral device 20 that is requested to be registered from the ID or the like of the peripheral device 20. Then, the AI assistant registers the peripheral device 20, which is requested to be registered, in a group corresponding to the specified type and function. After the registration, the AI assistant transmits a registration completion notification to each of the peripheral devices 20 of the group. At this time, the AI assistant may register one peripheral in a plurality of groups. Then, the process returns to step S201. Note that the completion notification includes an ID or the like as information for identifying the registered peripheral device 20. With this ID or the like, each of the peripheral devices 20 recognizes that a new peripheral device 20 has been registered. Then, the user may decide what device is registered in a group for each user situation and each expected event and whether to acquire linked information or perform an operation and the user may automatically set them from user behavior patterns. For example, a user's behavior immediately after the user comes home on a hot day varies with his or her preference and behavior pattern, such as whether the user turns on the air conditioner or electric fan (in a room), prepares a bath, or turns on a TV. Accordingly, a device to be used varies with a user and a user's situation. However, there is a device that need not be linked in connection with that the user comes home on a hot day, and it is meaningless to operate such a device purposely and exhaust the battery. It is better to link, for example, information of a room to be used by the user to lighting, air conditioning, AV devices and the like. The linkage of devices is important because any one device may not satisfy the user. If there are no interesting TV programs when the user turns on the TV, it is preferable to read the newspaper, stream the music and prompt the user to see the photos in linkage with their corresponding devices. In this case, unless information items of the individual devices are collected, it is impossible to make a general judgment and it is necessary to set and program the priority and determine specific rules by learning such as repetition of behavior grasping, and these may be carried out in this step or the like. In other words, the smart speaker is a central control device that communicates with a plurality of peripheral devices and is configured to acquire a result of communication with the peripheral devices forming a group as summary information of the group including a topic provided for the central control device and to offer a service responding to user's needs as a central control device including a control circuit that transmits information corresponding to the summary information.

In step S205, the AI assistant determines whether the topic information has been received from the peripheral device 20. When it is determined in step S205 that the topic information has been received from the peripheral device 20, the process proceeds to step S206. When it is determined in step S205 that the topic information has not been received from the peripheral device 20, the process proceeds to step S209.

In step S206, the AI assistant determines a response based on the provided topic information. After that, the process returns to step S207. For example, when a proposal for charging is provided as the topical information, the AI assistant determines whether to suggest charging to the user. For example, when a proposal for image editing is provided as the topic information, the AI assistant determines whether to suggest editing of images. The AI assistant may integrate the topic information provided from the peripheral devices 20 to determine a response. For example, upon receipt of a proposal for sharing of contents from the PC or the smartphone and a proposal for image sharing from the digital camera, the AI assistant may determine a proposal for transmission of the image of the digital camera to the PC or the smartphone as the response. The AI assistant may also determine a response across the peripheral devices 20. For example, when the user's schedule of going out is grasped by the PC or the smartphone, the AI assistant performs, as the response, making cleaning done by the vacuum cleaner while going out, or making the refrigerator investigate the food and drink often taken out by the user while going out. At the same time, the AI assistant may determine to propose to the user to carry the digital camera when going out. In addition, the response determined by the topic information provided from the peripheral device 20 may not be limited to one. In this case, the AI Assistant may determine to allow the user to select one of the responses. The peripheral device that has made a number of proposals, which is selected by the user, may be set as a representative peripheral device in the next group.

In step S207, the AI assistant performs an operation according to the determination. After that, the process proceeds to step S208. For example, the AI assistant proposes charging to the user in such a manner as "charging is proposed from camera 1," or proposes editing of unedited images in such a manner as "unedited image seems to be in camera 1". In step S207, the AI assistant may perform proposals or the like only when the user is nearby. When the security information is associated with the provided topic information, the proposal is performed by e-mail other than voice. The AI assistant may also perform proposals by voice when only the specific user is nearby. In addition, as a result of the determination, it is considered that only the topic information is stored in the central control device 10. In such a case, the AI Assistant does not perform anything in particular. The topic information accumulated in step S207 may be used, for example, when the voice is input from the user or when another topic information is provided.

In step S208, the AI assistant notifies the peripheral device 20 that the response has been performed based on the provided topic information using the communication circuit 112. After that, the process returns to step S201. This notification may be provided only for the representative peripheral device 20 and for the peripheral devices 20 in the group. Note that when the response is performed across the peripheral devices 20, the AI assistant notifies each peripheral device.

In step S209, the AI assistant determines whether there is a topic to be newly reported to the user. The topic in step S209 is a topic with a little relation to topic information provided from the peripheral device 20, such as news or weather forecast. When it is determined in step S209 that there is a topic to be newly reported to the user, the process proceeds to step S210. When it is determined in step S209 that there is no topic to be newly reported to the user, the process returns to step S201.

In step S210, the AI assistant reports the topic to the user by, for example, using the speaker of the voice output circuit 108. After that, the process returns to step S201.

As described above, according to the first embodiment, in the communication system including the central control device and the peripheral devices, the peripheral devices voluntarily provide the central control device with topic information that can be a topic. Accordingly, it is expected that the AI assistant of the central control device will make it easier to perform various determinations. Since, furthermore, the peripheral devices voluntarily provide the central control device with topic information that can be a topic, it is also expected to increase the utility value of each of the peripheral devices.

According to the first embodiment, furthermore, the peripheral devices form a group, and integrate the topics in advance in the group and then provide a topic for the central control device. Thus, the possibility that a large number of topics to be provided will confuse the determination of the central control device and delay the determination, is inhibited. In addition, the representative peripheral device is expected to make a complicated proposal that cannot be made only by a single peripheral device.

Second Embodiment

Below is a description of a second embodiment. In the second embodiment, the second information is transmitted using communication with low power consumption, as compared with the first embodiment. Hereinafter, a difference from the first embodiment will be mainly described. For example, even in the second embodiment, the configurations illustrated in FIGS. 1 to 3 are applied as a basic configuration of the communication system 1. Therefore, a description of the basic configuration as the communication system 1 will be omitted. In the following description, the peripheral device 20 is defined as a digital camera. However, the technique of the second embodiment is applied to various peripheral devices other than the digital camera.

In the second embodiment, the information transmitted as the second information is divided into summary and details.

The summary is information about the summary of information to be transmitted to the central control device 10. The summary is information with a smaller amount of data than the details. This summary is included in an advertising signal and transmitted. The advertising signal is a low power consumption signal transmitted for allowing the central control device 10 to discover the peripheral device 20 before communication connection is established by the first communication circuit between the peripheral device 20 and the central control device 10. When the advertising signal is detected, the central control device 10 issues a connection permission signal to the peripheral device 20. Accordingly, the communication between the peripheral device 20 and the central control device 10 is established. The communication with low power consumption can be performed using such an advertising signal. Since the advertising signal is a signal with low power consumption, it is difficult to include large capacity information. Therefore, in the second embodiment, only the summary of the information to be transmitted to the central control device 10 is included in the advertising signal.

The details are details of information to be transmitted to the central control device 10. Detailed information including the details is transmitted from the peripheral device 20 to the central control device 10 when a request from the central control device 10 is received. The detailed information is transmitted after the communication is established by the second communication circuit between the central control device 10 and the peripheral device 20.

FIGS. 11A, 11B and 11C are diagrams each illustrating an example of contents of the advertising signal and the detailed information communicating as the second information transmission.

As illustrated in FIGS. 11A, 11B and 11C, the advertising signal in the second information transmission includes a universally unique identifier (UUID). The UUID is an ID uniquely assigned to each of the peripheral devices. The central control device 10 specifies the peripheral device 20 by the UUID included in the advertising signal. As the summary of the topic, the advertising signal includes, for example, information indicating the presence or absence of a topic and negotiation information. The negotiation information is information to specify a peripheral device associated with the integrated topic and includes, for example, the ID of the peripheral device. The negotiation information may also include information different from an advertising signal transmitted at the time of purchase of a digital camera, an advertising signal transmitted before photography, an advertising signal transmitted on night after photography, and an advertising signal transmitted in other situations may be included.

As illustrated in FIGS. 11A, 11B and 11C, the advertising signal at the time of purchase includes information about the presence or absence of proposal for charging as a summary of topics on the remaining battery level, an ID of a camera targeted for the proposal as information to specify the camera, and the like. The advertising signal at the time of purchase includes information about the presence or absence of proposal for memory exchange as a summary of topics on the remaining memory capacity, an ID of a camera targeted for the proposal as information to specify the camera, and the like. The advertising signal at the time of purchase includes information about the presence or absence of a sample image to be proposed for utilization, as a summary of topics on the image utilization, an ID of a camera targeted for the image utilization as information to specify the camera, and the like. The advertising signal at the time of purchase includes information about the presence or absence of proposal for use as a summary of topics on the use of a camera, an ID of a camera targeted for the proposal as information to specify the camera, and the like. The advertising signal at the time of purchase includes information about the presence or absence of a topic as a summary of other topics, an ID of a camera targeted for a topic as information to specify the camera, and the like. The advertising signal at the time of purchase includes an ID of a camera as information to specify a peripheral device associated with the integrated topic, and the like as negotiation information.

The advertising signal before photography includes information about the presence or absence of proposal for charging as a summary of topics on the remaining battery level, an ID of a camera targeted for the proposal as information to specify the camera, and the like. The advertising signal before photography includes information about the presence or absence of proposal for memory exchange as a summary of topics on the remaining memory capacity, an ID of a camera targeted for the proposal as information to specify the camera, and the like. The advertising signal before photography includes information about the presence or absence of a sample image as a summary of topics on the image utilization, an ID of a camera targeted for the utilization as information to specify the camera, and the like. The advertising signal before photography includes information about the presence or absence of a topic as a summary of other information, an ID of a camera targeted for a topic as information to specify the camera, and the like. The advertising signal before photography includes an ID of a camera as information to specify a peripheral device associated with the integrated topic, and the like as negotiation information.

The advertising signal of night after photography includes information about the presence or absence of proposal for charging as a summary of topics on the remaining battery level, an ID of a camera targeted for the proposal as information to specify the camera, and the like. The advertising signal of night after photography includes information about the presence or absence of proposal for memory exchange as a summary of topics on the remaining memory capacity, an ID of a camera targeted for the proposal as information to specify the camera, and the like. The advertising signal of night after photography includes information about the presence or absence of each of proposals for image reproduction, image sharing, image editing and image organization as a summary of topics related to image utilization, an ID of a camera targeted for the proposal as information to specify the camera, and the like. The advertising signal of night after photography includes information about the presence or absence of information about the image captured today as a summary of the information about the image captured today, an ID as information to specify a camera that provides the image captured today, and the like. The advertising signal of night after photography includes information about the presence or absence of information about the images captured so far as a summary of the information about the images captured so far, an ID as information to specify a camera that provides the image captured so far, and the like. The advertising signal of night after photography includes information about the presence or absence of proposal for use as a summary of topics on the use of a camera, an ID of a camera targeted for the proposal as information to specify the camera, and the like. The advertising signal of night after photography includes information about the presence or absence of a topic as a summary of other topics, an ID of a camera targeted for a topic as information to specify the camera, and the like. The advertising signal of night after photography includes an ID of a camera as information to specify a peripheral device associated with the integrated topic, and the like as negotiation information.

In addition, even though the advertising signal corresponds to none of the time of the purchase, the time before photography, and the night after photograph, when the remaining battery level is low, an advertising signal including information indicating the presence or absence of proposal for charging and an ID to identify a camera targeted for the proposal as a summary of topics on the remaining battery level is transmitted. When the remaining memory capacity is small, an advertising signal including information about the presence or absence of proposal for memory exchange is transmitted as a summary of topics related to the remaining memory capacity. When there is an image that is not reproduced, shared, edited or arranged, an advertising signal including information about the presence or absence of proposal for image reproduction, sharing, editing or organization is transmitted as a summary of topics related to the image utilization. When there is no long-term use of the digital camera, an advertising signal including information about the presence or absence of proposal related to the use of the camera and information about the presence or absence of information about the images captured so far is transmitted.

As illustrated in FIGS. 11A, 11B and 11C, the detailed information in the second information transmission includes details of topics on the remaining battery level, details of topics on the remaining memory capacity, details of topics on the image utilization, details of topics on the images captured today, details of topics on the images captured so far, details of topics on the use of the camera, and details of other topics. The detailed information may also include information different from the detailed information transmitted at the time of purchase of the digital camera, the detailed information transmitted before photography, the detailed information transmitted at night after photography, and the detailed information transmitted in other circumstances.

The detailed information at the time of purchase includes the value of the actual remaining battery level as details of the topics on the remaining battery level. The detailed information at the time of purchase includes the value of the actual remaining memory capacity as details of the topic on the remaining memory capacity. The detailed information at the time of purchase includes an image file name of the sample image as details of topics related to the image utilization. The detailed information at the time of purchase may include an image file itself of the sample image as details of topics related to the image utilization. The detailed information at the time of purchase includes various tips for advising the image file of the sample image and how to use the digital camera as details of topics related to the use of the camera. In addition, the detailed information at the time of purchase includes details such as proposal for reading an instruction manual, proposal for initial setting, introduction of optional items, or the like as details of other topics.

The detailed information before photography includes the value of the actual remaining battery level as details of the topics on the remaining battery level. The detailed information before photography includes the value of the actual remaining memory capacity as details of the topic on the remaining memory capacity. The detailed information before photography includes an image file name of a sample image as details of topics related to the image utilization. The detailed information before photography may include an image file itself of the sample image as details of topics related to the image utilization. The detailed information before photography includes various tips for advising proposals on the use of specific accessories according to photography scenes and how to use the digital camera as details of other topics.

The detailed information of night after photography includes the value of the actual remaining battery level as details of the topics on the remaining battery level. The detailed information of night after photography includes the value of the actual remaining memory capacity as details of the topic on the remaining memory capacity. The detailed information of night after photography includes the image file name of the subject of proposal for image reproduction, image sharing, image editing as details of topics related to the image utilization. The detailed information of night after photography may include the image file itself of the subject of proposal for image reproduction, image sharing, image editing as details of topics related to the image utilization. The detailed information of night after photography includes information about the cumulative number of images captured today, the subject to be imaged for each capturing, capturing conditions, and the presence or absence of accessory as details of the information about the images captured today. The detailed information of night after photography includes today's snapshots, group photographs, landscape photographs, the number of captured movie images, photography subjects for each photography, photography conditions, and presence or absence of accessories as details of information about the images captured today. The detailed information of night after photography includes the information about the number of failed images captured today and the details of each failure as details of the information about the images captured today. The failure information includes information such as the presence or absence of out-of-focus, the presence or absence of blown-out highlight, the presence or absence of blocked-up shadow, and many similar pictures. In addition, the failure information may include technical advice for not failing. The detailed information of night after photography includes information about the cumulative number of images captured so far, the subject to be imaged for each photography, photography conditions, and the presence or absence of accessory as details of the information about the images captured so far. The detailed information of night after photography includes snapshots captured so far, group photographs, landscape photographs, the number of captured movie images, photography subjects for each photography dates, photography conditions, and presence or absence of accessories as details of information about the images captured so far. The detailed information of night after photography includes the information about the number of failed images captured so far and the details of each failure as details of the information about the images captured so far.

In addition, even when the detailed information corresponds to none of the time of purchase, the time before photography, and night after photography, the detailed information including the value of the actual remaining battery level may be transmitted when the advertising signal including the summary of the topic on the remaining battery level is transmitted. Furthermore, the detailed information including the value of the actual remaining memory capacity may be transmitted when the advertising signal including the summary of the topic on the remaining memory capacity is transmitted. When the advertising signal including the summary of topics related to the image utilization is transmitted, the detailed information including the image file name proposed for image reproduction, sharing, or editing can be transmitted. When the advertising signal including the summary of the information about the already captured image is transmitted, the detailed information including details of the information about the already captured image can be transmitted. When the advertising signal including the summary of topics related to the use of the camera is transmitted, the image file name of the sample image, various tips for advising how to use the digital camera, detailed information including details of the information about the images captured so far can be transmitted.

Here, the contents of the advertising signal and the detailed information illustrated in FIGS. 11A, 11B and 11C are examples. The advertising signal or the detailed information may include those other than those illustrated in FIGS. 11A, 11B and 11C, or a part of those illustrated in FIGS. 11A, 11B and 11C may not be included. However, the UUID is included in the advertising signal. The contents of the "summary" included in the advertising signal is not limited to the presence or absence of information. Information as much as the capacity of the advertising signal is permitted may be included in the "summary." The contents of the "summary" may be compressed and included in the advertising signal.

Figure 12A:
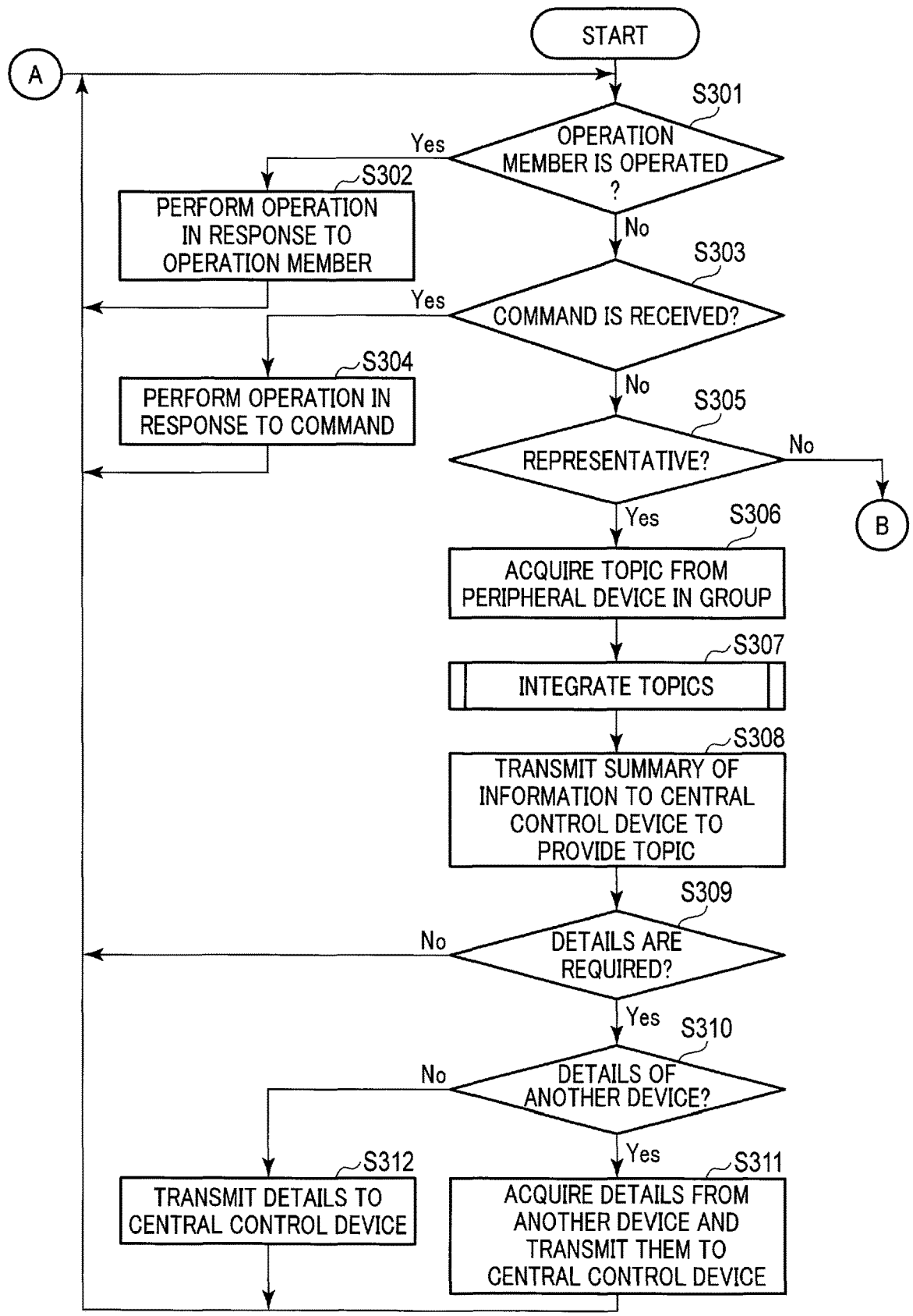
FIG. 12A is a flowchart illustrating the operation of the peripheral device in the second embodiment.
Figure 12B:
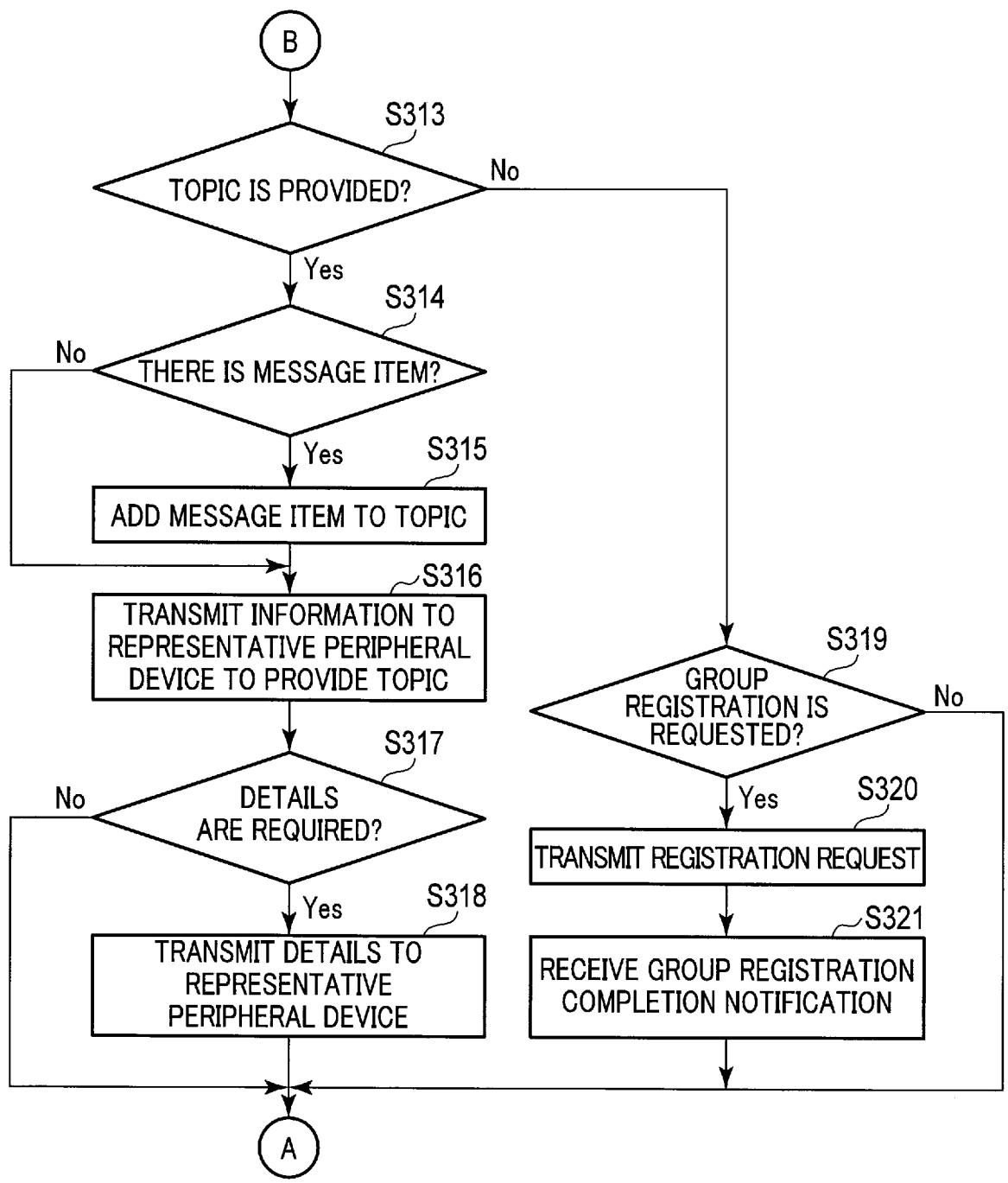
FIG. 12B is a flowchart illustrating the operation of the peripheral device in the second embodiment.

Next, the operation of the communication system 1 will be described. FIGS. 12A and 12B are a flowchart showing the operation of the peripheral device 20 in the second embodiment. The operation of FIGS. 12A and 12B is controlled by the control circuit 202 of the peripheral device 20. The operation illustrated in FIGS. 12A and 12B may be performed in any case where the peripheral device 20 is powered on or off.

In step S301, the control circuit 202 determines whether the operation member 208 is operated by the user. When it is determined in step S301 that it is operated by the user, the process proceeds to step S302. When it is determined in step S301 that it is not operated by the user, the process proceeds to step S303.

In step S302, the control circuit 202 performs an operation corresponding to the operation member 208 operated by the user. After the operation is performed, the process returns to step S301.

In step S303, the control circuit 202 determines whether a command from the central control device 10 has been received. When it is determined in step S303 that the command from the central control device 10 has been received, the process proceeds to step S304. When it is determined in step S303 that the command from the central control device 10 is not received, the process proceeds to step S305.

In step S304, the control circuit 202 performs an operation corresponding to the command. After the operation is performed, the process returns to step S301.

In step S305, the control circuit 202 determines whether a peripheral device is currently designated as a representative one. When it determines in step S305 whether a peripheral device is currently designated as a representative one, the process proceeds to step S306. When it determines in step S305 whether a peripheral device is not currently designated as a representative one, the process proceeds to step S313.

In step S306, the control circuit 202 communicates with another peripheral device in the same group to acquire a topic.

In step S307, the control circuit 202 integrates its own topic with the topic acquired from the peripheral device to generate a summary of the topic to be provided for the central control device 10. The process of step S307 may be performed in the same manner as that of FIG. 8. In step S307, however, a summary of the topic is finally generated. As described above, the summary of the topic includes information about the presence or absence of a topic to be transmitted by the control circuit 202, information to specify a peripheral device targeted for a topic, and information to specify a peripheral device involved in generation of a topic.

In step S308, the control circuit 202 transmits an advertising signal including a summary of topic information including the generated topic using the communication circuit 212. The control circuit 202 may include, in the advertising signal, information indicating that information to be transmitted includes a summary of notification. After that, the process proceeds to step S309.

In step S309, the control circuit 202 determines whether there is a request for details as well as connection permission. When it determine in step S309 that there is a request for details, the process proceeds to step S310. When it determines in step S309 that there is no request for details, the process returns to step S301.

In step S310, the control circuit 202 determines whether the requested details are details about a topic of another peripheral device. When the control circuit 202 determines in step S310 that the requested details are details about a topic of another peripheral device, the process proceeds to step S311. When the control circuit 202 determines in step S310 that the requested details are not details about a topic of another peripheral device, the process proceeds to step S312.

In step S311, the control circuit 202 acquires detailed information including the details, which are required from the central control device 10, from its corresponding peripheral device 20. Then, the control circuit 202 transmits the acquired detailed information to the central control device 10 using, for example the communication circuit 212. After that, the process returns to step S301.

In step S312, the control circuit 202 transmits detailed information including the details requested from the central control device 10 to the central control device 10 using, for example, the communication circuit 212. After that, the process returns to step S301.

As will be described in detail later, when the central control device 10 requests details, it makes a communication connection permission by the first communication circuit and a communication connection request by the second communication circuit to the peripheral device 20. In step S311 or S312, the peripheral device 20 transmits the detailed information using the second communication circuit. As described above, the second communication circuit allows a large-capacity information to be transmitted.

In step S313, the control circuit 202 determines whether to provide a topic. For example, the control circuit 202 determines to provide a topic when it is requested to acquire a topic from a representative peripheral device and there is a topic to be provided at the present time. When the control circuit 202 determines in step S313 to provide a topic, the process proceeds to step S314. When the control circuit 202 determines in step S313 not to provide a topic, the process proceeds to step S317.

In step S314, the control circuit 202 determines whether there is a "message item" to the representative peripheral device 20. When the control circuit 202 determines in step S314 that there is a message item, the process proceeds to step S315. When the control circuit 202 determines in step S314 that there is no message item, the process proceeds to step S316.

In step S315, the control circuit 202 adds the message item to the topic. Then, the process proceeds to step S316. The message item is associated with each topic, for example.

In step S316, the control circuit 202 transmits the topic information including the generated topic to the representative peripheral device 20 using the communication circuit 212. Then, the process returns to step S301.

In step S317, the control circuit 202 determines whether to request details from the representative peripheral device 20. When the control circuit 202 determines in step S317 that it requests details, the process proceeds to step S318. When the control circuit 202 determines in step S317 that it requests no details, the process returns to step S301.

In step S318, the control circuit 202 transmits the requested detailed information to the representative peripheral device 20 using, for example, the communication circuit 212. Then, the process returns to step S301.

In step S319, the control circuit 202 determines whether to request registration of a group. When the control circuit 202 determines in step S319 to request registration of a group, the process proceeds to step S320. When the control circuit 202 determines in step S319 not to request registration of a group, the process returns to step S301.

In step S320, the control circuit 202 transmits a request for registration of a group using the communication circuit 212. In step S321, the control circuit 202 receives a notification of completion of the registration of a group from the central control device 10. Then, the process returns to step S301.

Figure 13:
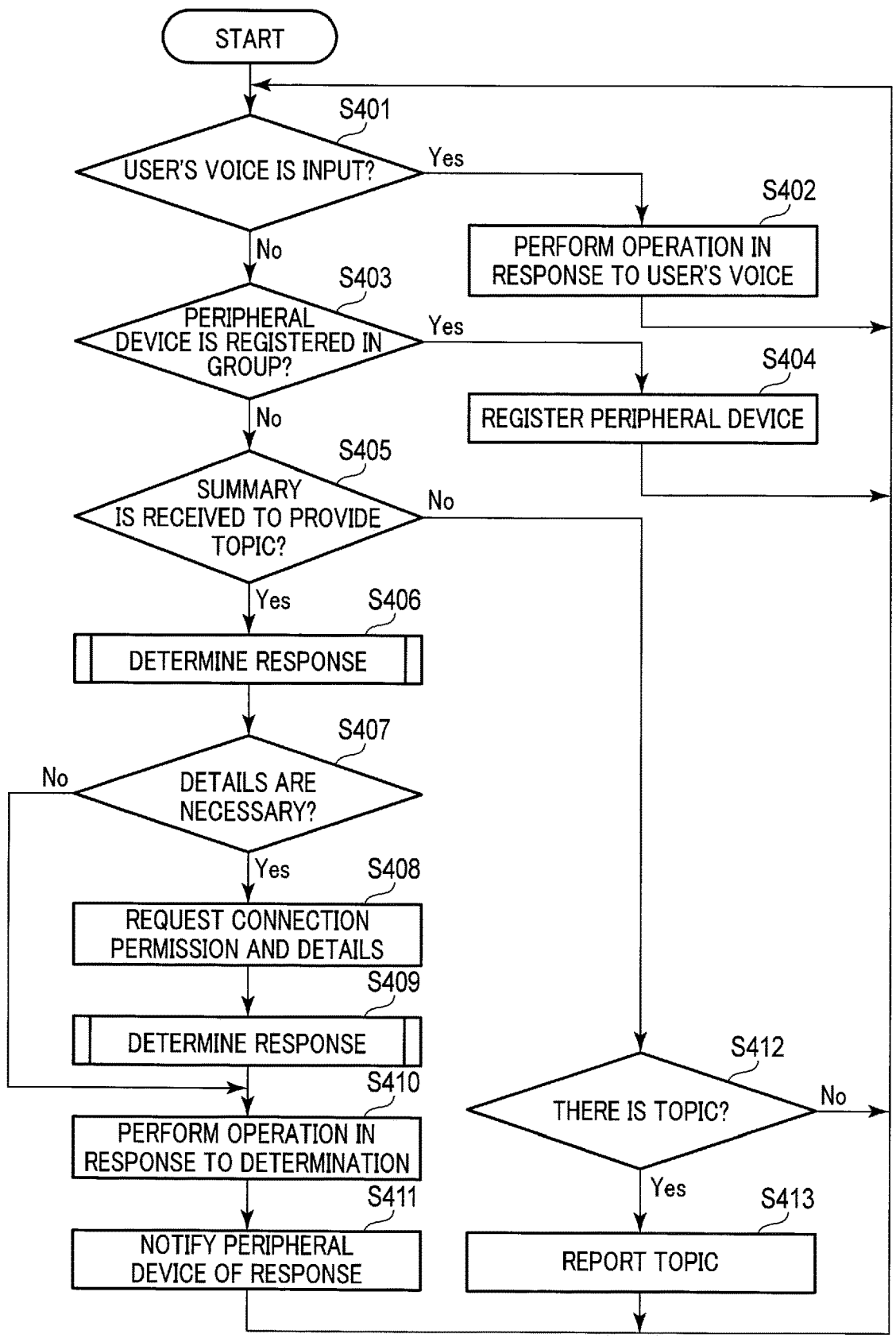
FIG. 13 is a flowchart illustrating the operation of the central control device in the second embodiment.

FIG. 13 is a flowchart showing the operation of the central control device 10 in the second embodiment. The operation of FIG. 13 is controlled by the AI assistant achieved by the control circuit 102 or the like of the central control device 10.

In step S401, the AI assistant determines whether user's voice is input. When it is determined in step S401 that user's voice is input, the process proceeds to step S402. When it is determined in step S401 that no user's voice is input, the process proceeds to step S403. Note that when a specific activation word is set in the central control device 10, the process after step S401 need not be performed until the user issues an activation word.

In step S402, the AI assistant recognizes the input voice and performs an operation corresponding to the recognized voice. After that, the process returns to step S401.

In step S403, the AI assistant determines whether to register a new peripheral device in the group from the peripheral devices 20. When the AI assistant determines that it has received a group registration request from the peripheral devices 20, the process proceeds to step S404. In step S403, when the AI assistant determines that it does not receive a group registration request from the peripheral devices 20, the process proceeds to step S405.

In step S404, the AI assistant registers the peripheral device 20 using the communication circuit 112. Then, the process returns to step S401.

In step S405, the AI assistant determines whether it has received a summary of the topic information from the peripheral device 20. When the AI assistant determines in step S405 that it has received a summary of the topic information from the peripheral device 20, the process proceeds to step S406. When the AI assistant determines in step S405 that it does not receive a summary of the topic information from the peripheral device 20, the process proceeds to step S412.

In step S406, the AI assistant determines a response based on the provided topic information. After that, the process proceeds to step S407. Step S406 will be described in detail later.

In step S407, the AI assistant determines whether the details of the provided topic information are necessary. When the AI assistant determines in step S406 that it is difficult to determine a response only by the summary of the topic, it determines that details of the provided topic information is necessary. When the AI assistant determines in step S407 that the details of the provided topic information are necessary, the process proceeds to step S408. When the AI assistant determines in step S407 that the details of the provided topic information are not necessary, the process proceeds to step S410.

In step S408, the AI assistant notifies the peripheral device 20 that a communication connection has been permitted using the first communication circuit of the communication circuit 112. After that, the AI assistant performs a connection process with the peripheral device 20 using the second communication circuit. When the communication connection is performed by the second communication circuit, the AI assistant requests details. After that, the process proceeds to step S409.

In step S409, the AI assistant determines a response based on the provided topic information. After that, the process proceeds to step S410. Step S409 will be described in detail later.

In step S410, the AI assistant performs an operation according to the determination of step S406 or step S409. After that, the process proceeds to step S411. Note that when the operation is performed, the AI assistant may convert information exchange with the peripheral device 20 into a voice or the like and report the same to the user.

In step S411, the AI assistant notifies the peripheral device 20 that the response has been performed based on the provided information using, for example, the first communication circuit of the communication circuit 112. After that, the process returns to step S401. Note that the notification in step S411 may be performed after switching to the notification by the second communication circuit if the data amount increases.

In step S412, the AI assistant determines whether there is a topic to be newly reported to the user. When the AI assistant determines in step S412 that there is the topic to be newly reported to the user, the process proceeds to step S413. When the AI assistant determines in step S412 that there is no topic to be newly reported to the user, the process returns to step S401.

In step S413, the AI assistant reports the topic to the user by, for example, using the speaker of the voice output circuit 108. After that, the process returns to step S401.

Figure 14:
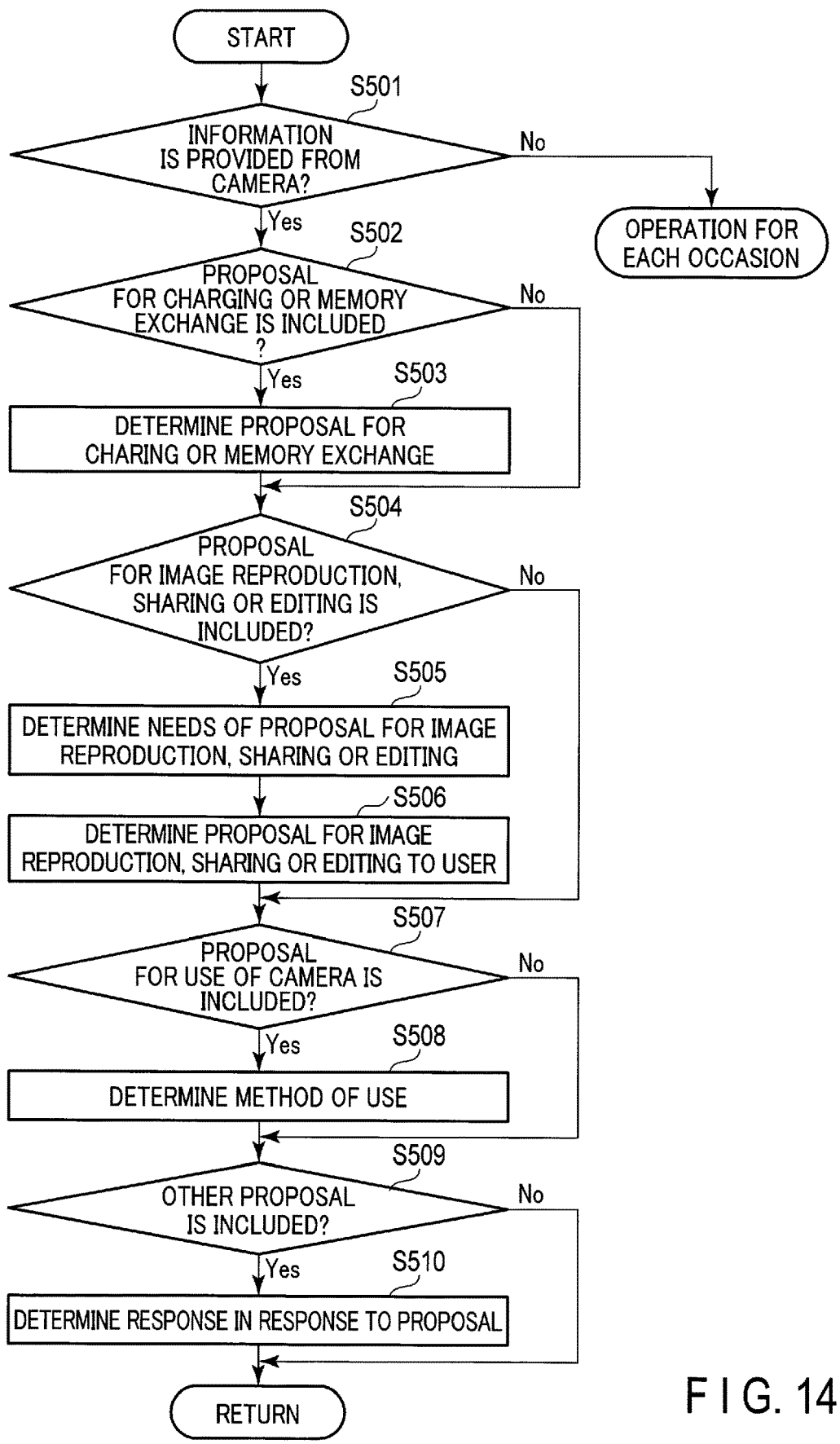
FIG. 14 is a flowchart illustrating details of a response determination process.

FIG. 14 is a flowchart showing details of the response determination process in step S406 or step S409 of FIG. 13. In step S501, the AI assistant determines whether the topic information is provided from the digital camera. When the AI assistant determines in step S501 that the topic information is provided from the digital camera, the process proceeds to step S502. When the AI assistant determines in step S501 that the topic information is not provided from the digital camera, a determination process is performed in accordance with each peripheral device. Here, details of the determination process according to each peripheral device will not be described.

In step S502, the AI assistant determines whether the topic information includes a proposal for charging or memory exchange. For example, in the summary, when a proposal for charging or memory exchange is set to be present, the AI assistant determines that the topic information includes a proposal related to charging or memory exchange. For example, even when information about the remaining battery level or the remaining memory capacity is provided as details, the AI assistant determines that the proposal includes a proposal related to charging or memory exchange. When the AI assistant determines in step S502 that the topic information includes a proposal related to charging or memory exchange, the process proceeds to step S503. When the AI assistant determines in step S502 that the topic information does not include a proposal related to charging or memory exchange, the process proceeds to step S504.

In step S503, the AI assistant determines a proposal for charging or memory exchange to the user. After that, the process proceeds to step S504. In step S503, the AI assistant may determine to present the actual remaining battery level or the remaining memory capacity to the user at the proposal for charging or memory exchange. In this case, the AI assistant also determines to request the information about the remaining battery level or the remaining memory capacity as details.

In step S504, the AI assistant determines whether the topic information includes a proposal for image reproduction, image sharing, image editing and image organization. For example, in the summary, when a proposal for image reproduction, image sharing, image editing or image organization is set to be present, the AI assistant determines that the topic information includes a proposal related to image reproduction, image sharing, image editing or image organization. For example, even when an image file name or an image file of a subject of a proposal for image reproduction, image sharing, image editing or image organization is provided as details, the AI assistant determines that the topic information includes a proposal related to charging or memory exchange. When the AI assistant determines in step S504 that the topic information includes a proposal related to image reproduction, image sharing, image editing or image organization, the process proceeds to step S505. When the AI assistant determines in step S504 that the topic information does not include a proposal related to image reproduction, image sharing, image editing or image organization, the process proceeds to step S507.

In step S506, the AI assistant determines a proposal for image reproduction, image sharing, image editing or image organization to the user. After that, the process proceeds to step S507. When a display is provided in the central control device 10, images subjected to a proposal for image reproduction, image sharing, image editing or image organization may be displayed on the display. In addition, when no display is provided in the central control device 10, images subjected to a proposal for image reproduction, image sharing, image editing or image organization may be displayed on another peripheral device having a display, such as a television. In these cases, the AI assistant also determines to request the image file as details. It is desirable that the group of a peripheral device to display an image be the same as that of a digital camera with images targeted for a proposal for image reproduction, image sharing, image editing or image organization.

In step S507, the AI assistant determines whether the topic information includes a proposal related to the use of the camera. For example, in the summary, when a proposal for the use of the camera is set to be present, the AI assistant determines that the topic information includes a proposal related to the use of the camera. When the AI assistant determines in step S507 that the topic information includes proposal related to the use of the camera, the process proceeds to step S508. When the AI assistant determines in step S507 that the topic information does not include a proposal related to the use of the camera, the process proceeds to step S509.

In step S508, the AI assistant determines how to use a digital camera for the user based on the topic information provided from the digital camera.

In step S509, the AI assistant determines whether the topic information includes a proposal related to the others. For example, in the summary, when a proposal for the others is set to be present, the AI assistant determines that the proposal includes a proposal related to the others. When the AI assistant determines in step S509 that the topic information includes a proposal related to the others, the process proceeds to step S510. When the AI assistant determines in step S509 that the topic information does not include a proposal related to the others, the process of FIG. 14 is terminated.

In step S510, the AI assistant determines a response based on the contents of the proposal. After that, the process of FIG. 14 is terminated.

As described above, according to the second embodiment, the information transmitted from the peripheral device is divided into the summary of the topic and the details of the topic. The summary is included in the advertising signal and transmitted. When the central control device can deal with only summary, the peripheral device does not transmit the detailed information. Therefore, in the second embodiment, the second information transmission can be performed with low power consumption, as compared with the first embodiment. Such low power consumption is useful particularly for mobile peripheral devices such as digital cameras and smartphones with a limited remaining battery level.

Under the environment of device cooperation as described above, it will be important to protect personal information and take measures against intrusion of malicious malware and the like. One of the measures is, for example, advanced encryption of information. Therefore, it is not preferable that not all the devices be controlled by connecting to other devices and the Internet. On the other hand, it is important in terms of security that a specific device as in the embodiment is used to grasp the status and information of other devices and transmit a summary as a representative.

In the embodiments, the portion described as "part" (section or unit) may be constituted by combining a dedicated circuit or a plurality of general-purpose circuits, and if necessary, may be constituted by combining a microcomputer that operates according to preprogrammed software, a processor such as a CPU, or a sequencer such as an FPGA. It is also possible to perform design such that an external device takes over all or part of the control, and in this case, a wired or wireless communication circuit is interposed therebetween. The communication may be performed through Bluetooth communication, Wi-Fi communication, a telephone line, or the like, and may be performed through a USB or the like. A dedicated circuit, a general-purpose circuit, or a control unit may be integrated as an ASIC.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A first peripheral device which communicates with a central control device, the first peripheral device comprising:
   a memory storing first topic information, the first topic including at least one of (A) a state of the first peripheral device, and (B) a usage history of the first peripheral device;
   a communication device having a first communication circuit and a second communication circuit, wherein the second communication circuit is a higher power, higher capacity communication circuit than the first communication circuit; and
   a control circuit configured to:
      acquire, from a second peripheral device, second information including second topic information, the second topic information including at least one of (A) a state of the second peripheral device, and (B) a usage history of the second peripheral device;
      integrate the first topic information with the second topic information, to generate third topic information, wherein the third topic information includes at least one topic aggregated and/or summarized from the first topic information and the second topic information and includes (1) an advertising signal portion and (2) a detailed portion; and
      cause the first communication circuit of the communication device to transmit the advertising signal portion of the third topic information to the central control device;
      receive, from the central control device, a request for the detailed portion of the third topic; and
      responsive to receiving the request for the detailed portion of the third topic, cause the second communication circuit of the communication device to transmit, from the first peripheral device to the control device, the detailed portion of the third topic information.

2. A communication system comprising:
   a first peripheral device storing first topic information, the first topic information including at least one of (A) a state of the first peripheral device, and (B) a usage history of the first peripheral device;
   a second peripheral device communicating with the first peripheral device and transmitting to the first peripheral device, second topic information, the second topic information including at least one of (A) a state of the second peripheral device, and (B) a usage history of the second peripheral device; and
   a central control device communicating with at least the first peripheral device,
   wherein the first peripheral device includes:
   a communication device having a first communication circuit and a second communication circuit, wherein the second communication circuit is a higher power, higher capacity communication circuit than the first communication circuit; and
   a control circuit configured to:
      acquire, from the second peripheral device, the second topic information;
      integrate the first topic information with the second topic information, to generate third topic information, wherein the third topic information includes at least one topic aggregated and/or summarized from the first topic information and the second topic information and includes (1) an advertising signal portion and (2) a detailed portion; and
      cause the first communication circuit of the communication device to transmit the advertising signal portion of the third topic information to the central control device;
      receive, from the central control device, a request for the detailed portion of the third topic; and
      responsive to receiving the request for the detailed portion of the third topic, cause the second communication circuit of the communication device to transmit, from the first peripheral device to the control device, the detailed portion of the third topic information.

3. A method executed in a communication system including a first peripheral device, a second peripheral device, and a central control device, the method comprising:
   storing, on the first peripheral device, first topic information, the first topic information including at least one of (A) a state of the first peripheral device, and (B) a usage history of the first peripheral device;

transmitting, from the second peripheral device to the first peripheral device, second topic information, the second topic information including at least one of (A) a state of the second peripheral device, and (B) a usage history of the second peripheral device;

receiving by the first peripheral device, the second topic information;

responsive to receiving the second topic information,
integrating, by the first peripheral device, (1) first topic information and (2) the second topic information, to generate third topic information, wherein the third topic information includes at least one topic aggregated and/or summarized from the first topic information and the second topic information and includes (1) an advertising signal portion, and (2) a detailed portion, and transmitting, from the first peripheral device to the central control device, the advertising signal portion of the third topic information, using a first communication circuit;

receiving, by the first peripheral device from the central control device, a request for the detailed portion of the third topic; and responsive to receiving the request for the detailed portion of the third topic, transmitting, from the first peripheral device to the control device, the detailed portion of the third topic information, using a second communication circuit, wherein the second communication circuit is a higher power, higher capacity communication circuit than the first communication circuit.

4. A non-transitory computer-readable recording medium recording communication programs in a communication system including a first peripheral device, a second peripheral device, and a central control device communicating, the communication programs causing the first peripheral device to perform a method comprising:

storing, on the first peripheral device, first topic information, the first topic information including at least one of (A) a state of the first peripheral device, and (B) a usage history of the first peripheral device;

transmitting, from the second peripheral device to the first peripheral device, second topic information, the second topic information including at least one of (A) a state of the second peripheral device, and (B) a usage history of the second peripheral device;

receiving by the first peripheral device, the second topic information;

responsive to receiving the second topic information,
integrating, by the first peripheral device, (1) first topic information and (2) the second topic information, to generate third topic information, wherein the third topic information includes at least one topic aggregated and/or summarized from the first topic information and the second topic information and includes (1) an advertising signal portion, and (2) a detailed portion, and transmitting, from the first peripheral device to the central control device, the advertising signal portion of the third topic information, using a first communication circuit;

receiving, by the first peripheral device from the central control device, a request for the detailed portion of the third topic; and responsive to receiving the request for the detailed portion of the third topic, transmitting, from the first peripheral device to the control device, the detailed portion of the third topic information, using a second communication circuit, wherein the second communication circuit is a higher power, higher capacity communication circuit than the first communication circuit.

5. The method of claim 3, further comprising:
receiving, by the central control device, the detailed portion of third topic information;

responsive to receiving the third topic information, determining, by the central control device, a proposal; and rendering the proposal to a user to prompt a user to take an action with respect to at least one of (A) the first peripheral device, and (B) the second peripheral device.

6. The method of claim 5, wherein both the first and second peripheral device are image capturing devices belong to a predetermined group of information capture devices.

7. The method of claim 3, wherein the first communication circuit is a Bluetooth Low Energy (BLE) communication circuit and the second communication circuit is a Wi-Fi communication circuit.

8. The system of claim 2 wherein the central control device:
receives the detailed portion of third topic information;

responsive to receiving the third topic information, determines a proposal; and renders the proposal to a user to prompt a user to take an action with respect to at least one of (A) the first peripheral device, and (B) the second peripheral device.

9. The system of claim 8, wherein both the first and second peripheral device are image capturing devices belong to a predetermined group of information capture devices.

10. The method of claim 2, wherein the first communication circuit is a Bluetooth Low Energy (BLE) communication circuit and the second communication circuit is a Wi-Fi communication circuit.

11. The non-transitory computer-readable medium of claim 4, wherein the method further comprises:
receiving, by the central control device, the detailed portion of third topic information;

responsive to receiving the third topic information, determining, by the central control device, a proposal; and rendering the proposal to a user to prompt a user to take an action with respect to at least one of (A) the first peripheral device, and (B) the second peripheral device.

12. The non-transitory computer-readable medium of claim 11, wherein both the first and second peripheral device are image capturing devices belong to a predetermined group of information capture devices.

13. The non-transitory computer-readable medium of claim 4, wherein the first communication circuit is a Bluetooth Low Energy (BLE) communication circuit and the second communication circuit is a Wi-Fi communication circuit.

* * * * *